United States Patent
Takano

(10) Patent No.: US 10,271,312 B2
(45) Date of Patent: Apr. 23, 2019

(54) BASE STATION, METHOD FOR RADIO COMMUNICATION, RADIO COMMUNICATION SYSTEM, AND RADIO TERMINAL

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 80 days.

(21) Appl. No.: 15/002,271

(22) Filed: Jan. 20, 2016

(65) Prior Publication Data

US 2016/0135165 A1    May 12, 2016

Related U.S. Application Data

(63) Continuation of application No. 13/818,697, filed as application No. PCT/JP2011/068370 on Aug. 11, 2011, now Pat. No. 9,271,273.

(30) Foreign Application Priority Data

Oct. 4, 2010 (JP) ................................. 2010-225081

(51) Int. Cl.
*H04W 4/00* (2018.01)
*H04W 72/04* (2009.01)
(Continued)

(52) U.S. Cl.
CPC ......... *H04W 72/0406* (2013.01); *H04L 5/001* (2013.01); *H04L 5/0037* (2013.01); *H04L 5/0094* (2013.01); *H04W 4/70* (2018.02); *H04W 72/121* (2013.01); *H04L 5/0023* (2013.01); *H04L 5/0055* (2013.01); *H04W 72/1221* (2013.01); *H04W 92/10* (2013.01)

(58) Field of Classification Search
CPC ....................................................... H04L 5/001
See application file for complete search history.

(56) References Cited

U.S. PATENT DOCUMENTS 8,441,996 B2 * 5/2013 Kim .................... H04W 36/385
370/252
9,019,922 B2 * 4/2015 Oizumi ................... H04L 5/001
370/329

(Continued)

FOREIGN PATENT DOCUMENTS

JP   2008-244559 A   10/2008
WO  2007/044173 A2   4/2007

(Continued)

OTHER PUBLICATIONS

Office Action for CN Patent Application No. 201180046988.X, dated Aug. 11, 2016, 6 pages of Office Action and 7 pages of English Translation.

(Continued)

*Primary Examiner* — Guang W Li
(74) *Attorney, Agent, or Firm* — Chip Law Group

(57) ABSTRACT

Provided is a base station including a control signal generating section that generates a control signal which includes resource information identified by a group identifier assigned to a plurality of radio terminals, and a transmitter section that transmits the control signal generated by the control signal generating section.

13 Claims, 19 Drawing Sheets

(51) Int. Cl.
  *H04L 5/00* (2006.01)
  *H04W 72/12* (2009.01)
  *H04W 4/70* (2018.01)
  *H04W 92/10* (2009.01)

(56) References Cited

U.S. PATENT DOCUMENTS

| | | | | |
|---|---|---|---|---|
| 9,173,213 | B2* | 10/2015 | Golitschek Edler von Elbwart | H04W 72/0453 |
| 2007/0121543 | A1* | 5/2007 | Kuchibhotla | H04W 72/005 370/329 |
| 2009/0143072 | A1* | 6/2009 | Montojo | H04W 68/02 455/450 |
| 2010/0279628 | A1* | 11/2010 | Love | H04L 5/0091 455/70 |
| 2011/0085506 | A1* | 4/2011 | Lee | H04L 5/0023 370/329 |
| 2012/0252447 | A1* | 10/2012 | Sartori | H04W 48/12 455/434 |
| 2012/0300752 | A1* | 11/2012 | Kwon | H04W 56/0005 370/336 |
| 2013/0003639 | A1* | 1/2013 | Noh | H04L 5/0053 370/312 |
| 2013/0016692 | A1* | 1/2013 | Chen | H04L 5/0053 370/330 |
| 2013/0077583 | A1* | 3/2013 | Kim | H04W 72/042 370/329 |
| 2013/0083753 | A1* | 4/2013 | Lee | H04W 72/0453 370/329 |
| 2013/0294361 | A1* | 11/2013 | Chen | H04L 5/0053 370/329 |

FOREIGN PATENT DOCUMENTS

| | | |
|---|---|---|
| WO | 2007/083080 A1 | 7/2007 |
| WO | 2009/058906 A2 | 5/2009 |

OTHER PUBLICATIONS

Extended European Search Report of EP Application No. 11830439.3, dated Dec. 21, 2016, 8 pages.

NTT Docomo, et al., "Signalling optimized DL scheduling for LTE", 3GPP Draft; R2-070272, 3rd Generation Partnership Project (3GPP), Mobile Competence Centre; 650, Route Des Lucioles, F-06921 Sophia-Antipolis Cedex; France, vol. RAN WG2, No. Sorrento, Italy, Jan. 15-19, 2007, 4 pages.

* cited by examiner

BASE STATION, METHOD FOR RADIO COMMUNICATION, RADIO COMMUNICATION SYSTEM, AND RADIO TERMINAL

CROSS REFERENCES TO RELATED APPLICATIONS

The present application is a continuation application of U.S. patent application Ser. No. 13/818,697, filed on Feb. 25, 2013 which is National Stage Entry of Application No. PCT/JP2011/068370 filed on Aug. 11, 2011 which claims the benefit of priority from prior Japanese Patent Application No. 2010-225081 filed in the Japan Patent Office on Oct. 4, 2010, the entire content of which is hereby incorporated by reference.

TECHNICAL FIELD

The invention relates to a base station, a method for radio communication, a program, a radio communication system, and a radio terminal.

BACKGROUND ART

Currently, standardization of a 4G radio communication system is under progress by 3GPP (Third Generation Partnership Project). According to the 4G, an improvement in maximum communication speed and a quality improvement in cell edges can be realized by using technologies such as relays and carrier aggregation. Further, considerations are given to improving coverage by introducing base stations other than eNodeB (macro-cell base station), such as HeNodeB (Home eNodeB, femtocell base station, compact base station for cell phones) and RHH (Remote Radio Head).
(Blind Decoding)

In a radio communication system as above, the base station notifies an assignment of a receiver resource to a UE (Downlink Assign), a grant of a transmitter resource (Uplink Grant) and the like by a control signal called PDCCH (Phy Downlink Control Channel). Here, resource information such as the Downlink Assign and the Uplink Grant are information for each UE (User Equipment). Due to this, the base station transmits the control signal so that each UE can extract the resource information addressed to itself, and each UE extracts the resource information addressed to itself from the PDCCH by a process called blind decoding. Hereinbelow, this feature will be described in detail.

The base station describes resource information addressed to each UE in smallest units of the control signal called CCE (Control Channel Element). Further, the base station adds, to the CCE, check bits that are obtained by CRC (Cyclic Redundancy Check) by masking the resource information with C-RNTI (Cell Radio Network Temporary Identify) that is an identifier unique to each UE.

When the PDCCH including a plurality of the aforementioned CCEs is received, the UE performs the CRC check by demasking each CCE by the UE's own C-RNTI. That is, the UE performs the CRC check of each CCE on an assumption that each CCE is addressed to itself, and determines the CCE with a normal result as the CCE addressed to itself. The above process by the UE is called the blind decoding, and such a blind decoding is described for example in Patent Literature 1.
(MTC)

On the other hand, debates on MTC (Machine Type Communications) are also in progress in the 3GPP. The MTC is generally synonymous to M2M (Machine to Machine), and refers to a communication between machines and not directly used by a human. The MTC primarily is performed between a server and a MTC terminal that is not directly used by a human.

For example, as a medical application of the MTC, a case may be assumed in which an MTC terminal collects electrocardiogram information of a human, and transmits the electrocardiogram information to a server by using uplink when a certain trigger condition is met. As another application of the MTC, a case may be assumed in which a vending machine is caused to function as an MTC terminal, and a server causes the vending machine under management to report sales once every certain cycle (for example, every 30 days).

Such an MTC terminal by way of example has the following features in general, however, not every MTC terminal needs to have all of the following features, and which of the features is to be endowed depends on applications.

Scarce needs to move (Low Mobility)
Transmission of small data (Online Small Data Transmission)
Very low power consumption (Extra Low Power Consumption)
Handled by grouping respective MTCs (Group-based MTC Features)

CITATION LIST

Patent Literature

Patent Literature 1: JP 2009-296589A

SUMMARY OF INVENTION

Technical Problem

However, due to the introduction of the aforementioned MTCs, increases are expected in a number of terminals existing within each cell, a number of terminals a base station is to contain in an Active mode, and a number of terminals for the base station to simultaneously control in the PDCCH. Further, the CCE included in the PDCCH also increases accompanying the increase in the number of terminals simultaneously controlled in the PDCCH.

As a result, load of the blind decoding in the UE increases due to a range requiring the blind decoding by the UE (including the MTC terminal) being broader. Especially, there are cases in which the extra-low power consumption is required in the MTC terminal, so the increase in the load of the blind decoding is problematic.

The invention has been created in view of the above problem, and an aim of the invention is to provide a novel and improved base station, method for radio communication, program, radio communication system, and radio terminal capable of suppressing the load of the blind decoding in the radio terminal.

Solution to Problem

According to an embodiment of the present disclosure, there is provided a base station including a control signal generating section that generates a control signal which includes resource information identified by a group identifier assigned to a plurality of radio terminals, and a transmitter section that transmits the control signal generated by the control signal generating section.

An uplink group identifier and a downlink group identifier may be assigned to the plurality of radio terminals, and the control signal generating section may generate the control signal in a manner that uplink resource information is identified by the uplink group identifier and downlink resource information is identified by the downlink group identifier.

The downlink resource information may be information indicating a resource for the plurality of radio terminals to perform simultaneous reception.

The uplink resource information may be information indicating a resource that is to be a reference for each of the plurality of radio terminals to decide a relative position of a transmitter resource.

The control signal generating section may dispose the resource information identified by a same group identifier in a predetermined frequency region in a control region for transmitting the control signal.

The control signal generating section may add a check bit obtained by masking the resource information with the group identifier to the resource information.

According to another embodiment of the present disclosure, there is provided a method for radio communication, the method including the steps of generating a control signal including resource information identified by a group identifier assigned to a plurality of radio terminals, and transmitting the control signal.

According to another embodiment of the present disclosure, there is provided a program for causing a computer to function as a control signal generating section that generates a control signal including resource information identified by a group identifier assigned to a plurality of radio terminals, and a transmitter section that transmits the control signal generated by the control signal generating section.

According to another embodiment of the present disclosure, there is provided a radio communication system including a plurality of radio terminals, and a base station that includes a control signal generating section that generates a control signal including resource information identified by a group identifier assigned to the plurality of radio terminals, and a transmitter section that transmits the control signal generated by the control signal generating section.

According to another embodiment of the present disclosure, there is provided a radio terminal including a receiver section that receives a control signal from a base station, and an acquiring section that acquires resource information identified by a group identifier assigned to a plurality of radio terminals including the radio terminal from the control signal received by the receiver section.

The acquiring section may acquire information identified by a terminal identifier assigned to the radio terminal from the control signal in a case of determining that the group identifier is not used by the base station.

According to another embodiment of the present disclosure, there is provided a method for radio communication performed by a radio terminal, the method including the steps of receiving a control signal from a base station, and acquiring resource information identified by a group identifier assigned to a plurality of radio terminals including the radio terminal from the control signal.

According to another embodiment of the present disclosure, there is provided a program for causing a computer to function as a radio terminal that includes a receiver section that receives a control signal from a base station, and an acquiring section that acquires resource information identified by a group identifier assigned to a plurality of radio terminals including the radio terminal from the control signal received by the receiver section.

Advantageous Effects of Invention

According to the invention as described above, the load of the blind decoding in the radio terminal can be suppressed.

DESCRIPTION OF EMBODIMENTS

Figure 1:
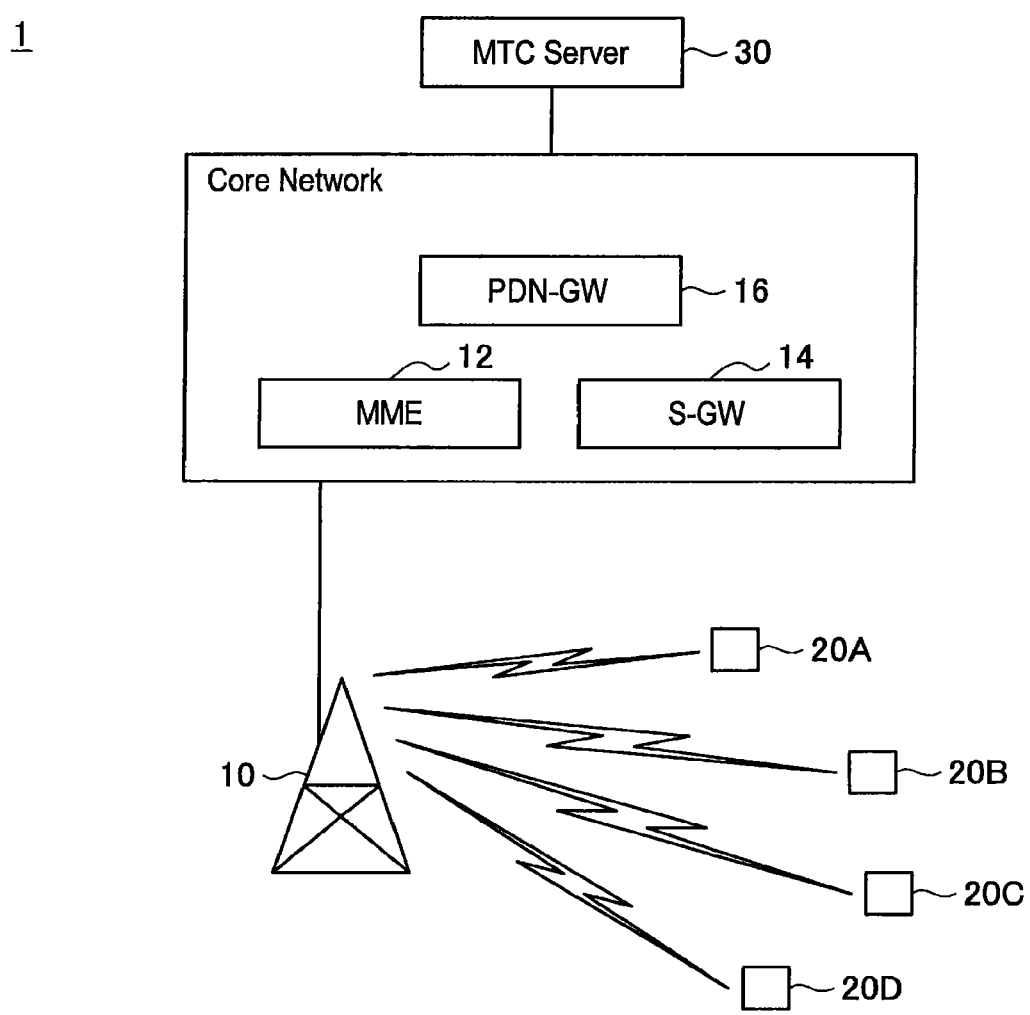
FIG. 1 is an explanatory diagram showing an example of a configuration of a radio communication system.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

Further, in the description and the drawings, there may also be cases in which a plurality of constituent features having substantially the same functional configuration is distinguished by adding different alphabets after the same reference sign. For example, the plurality of constituent features having substantially the same functional configuration may be distinguished as MTC terminals 20A, 20B, and 20C. However, in cases where the respective one of the plurality of constituent features having substantially the same functional configuration does not need to be particularly distinguished, only the same reference sign will be given. For example, when the MTC terminals 20A, 20B, and 20C do not particularly need to be distinguished, each will simply be termed a MTC terminal 20.

Further, the "mode to carry out the invention" will be described in accordance with the order in the below appendix.

1. Overview of Radio Communication System
1.1. Overview of radio communication system
1.2. Configuration of frame
1.3. Configuration of PDCCH
1.4. Blind decoding
2. Description of Respective Embodiments
2.1. First embodiment
   (Base station of first embodiment)
   (MTC terminal of first embodiment)
   (Operation of first embodiment)
   (Supplementation of first embodiment)
2.2. Second embodiment
2.3. Third embodiment
2.4. Fourth embodiment
2.5. Fifth embodiment
2.6. Sixth embodiment
2.7. Seventh embodiment
3. Conclusion

1. OVERVIEW OF RADIO COMMUNICATION SYSTEM

Currently, standardization of a 4G radio communication system is in progress in 3GPP. Embodiments of the invention can be adapted to the 4G radio communication system by way of examples, so an overview of the 4G radio communication system will be described.

1-1. Configuration of Radio Communication System

FIG. 1 is an explanatory diagram showing an example of a configuration of a radio communication system 1. As shown in FIG. 1, the radio communication system 1 includes a base station 10, a core network including an MME (Mobility Management Entity) 12, an S-GW (Serving Gateway) 14, and a PDN (Packet Data Network)-GW 16, MTC terminals 20, and an MTC server 30.

Embodiments of the invention can be adapted to radio communication devices such as the base station 10 and the MTC terminals 20 shown in FIG. 1. Notably, the base station 10 may for example be an eNodeB, a relay node, or a Home eNodeB that is a compact base station for home use. Further, the MTC terminals 20 are examples of user equipment (UE), and adaptations to non-MTC terminals such as a cell phone, PC (Personal Computer), and the like is also possible as embodiments of the invention.

The base station 10 is a radio base station that communicates with the MTC terminals 20. Although only one base station 10 is shown in FIG. 1, a large number of base stations 10 are connected to the core network in reality. Further, although depiction in FIG. 1 is omitted, the base station 10 communicates also with other user equipments such as a non-MTC terminal.

The MME 12 is a device that performs controls of settings, opening, and hand-over of a data communication session. The MME 12 is connected to the base station 10 via an interface called X2.

The S-GW 14 is a device that performs routing and transfer of user data. The PDN-GW 16 functions as a connecting node with an IP service network, and transfers the user data to and from the IP service network.

The MTC terminals 20 are radio terminals specialized for MTC, which is a communication between machines and is not used directly by a human, which is under discussion in the 3GPP. The MTC terminals 20 perform radio communication in accordance with an application with the base station 10. Further, the MTC terminals 20 perform bidirectional communication with the MTC server 30 via the core network.

For example, as a medical application of the MTC, a case may be assumed in which an MTC terminal 20 collects electrocardiogram information of a human, and transmits the electrocardiogram information to the server by using uplink when a certain trigger condition is met. As another application of the MTC, a case may be assumed in which a vending machine is caused to function as the MTC terminal 20, and the MTC server 30 causes the vending machine under management to report sales once every certain cycle (for example, every 30 days).

Such an MTC terminal 20 by way of example has the following features in general, however, not every MTC terminal 20 needs to have all of the following features, and which of the features is to be assigned depends on applications.

Scarce needs to move (Low Mobility)
Transmission of small data (Online Small Data Transmission)
Very low power consumption (Extra Low Power Consumption)
Handled by grouping respective MTCs (Group-based MTC Features)

1-2. Configuration of Frame

Although details of the aforementioned base station 10 and MTC terminals 20 are not decided, they are expected to perform radio communication conforming to communication between the eNodeB and the UE. Thus, hereinbelow, a radio frame shared between the eNodeB and the UE will be described. Contents to be described hereinbelow can be applied to the communication between the base station 10 and the MTC terminals 20.

Figure 2:
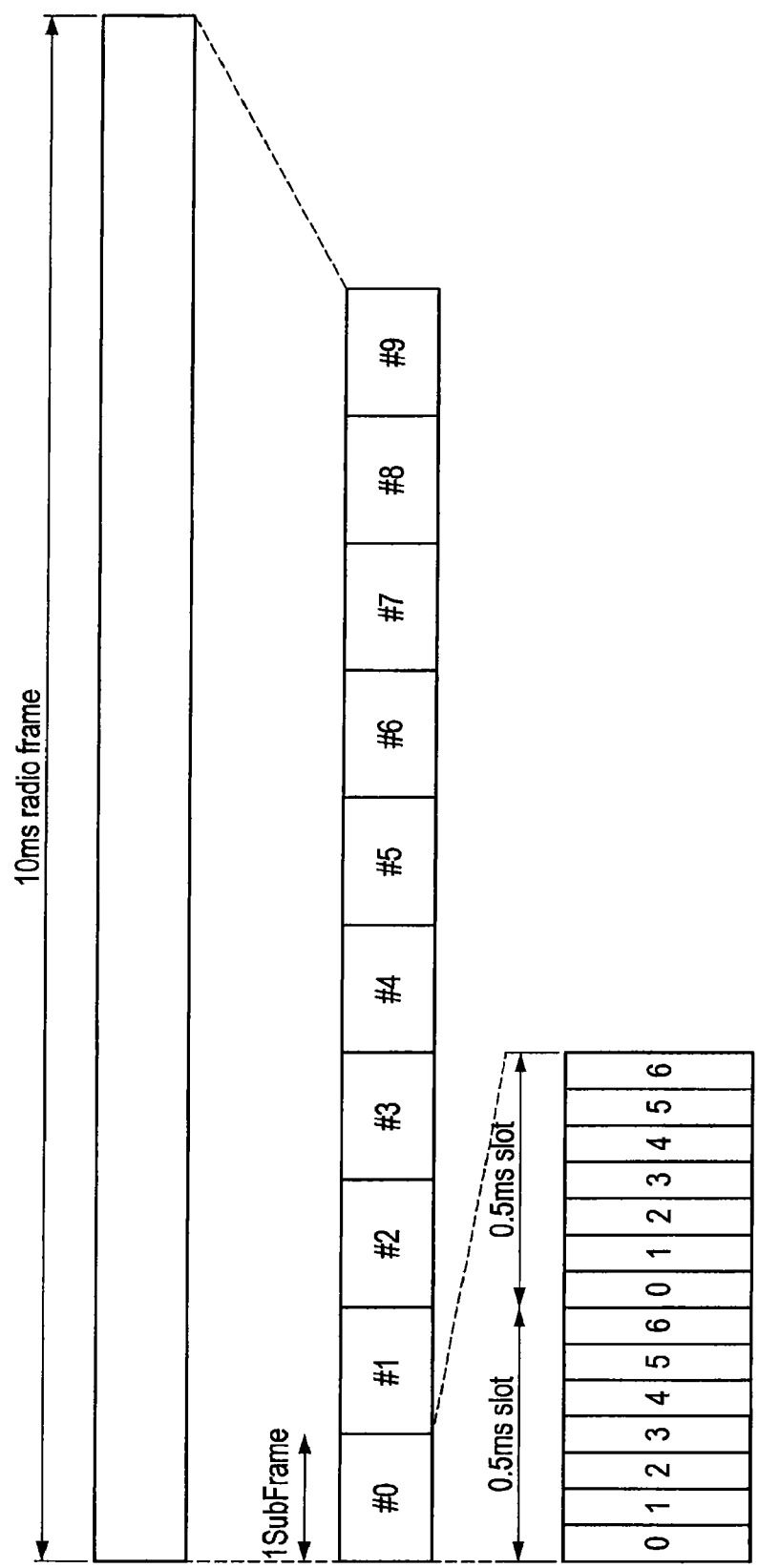
FIG. 2 is an explanatory diagram showing a 4G frame format.

FIG. 2 is an explanatory diagram showing a 4G frame format. As shown in FIG. 2, a 10 ms radio frame is configured of ten 1 ms sub frames #0 to #9. Further, each 1 ms sub frame is configured of two 0.5 ms slots. Further, each 0.5 ms slot is configured of seven Ofdm symbols.

Notably, the Ofdm symbol is a unit used in a communication scheme of an OFDM (Orthogonal Frequency Division Multiplexing) modulation system, and is a unit by which data processed in one FFT (Fast Fourier Transform) is outputted.

Figure 3A:
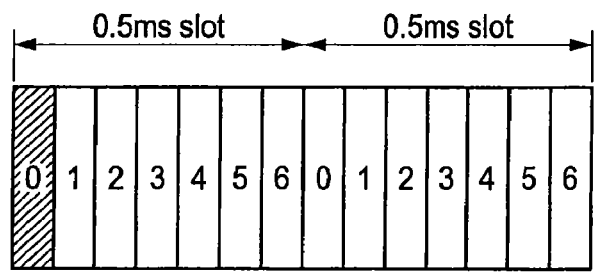
FIG. 3A is an explanatory diagram showing an example of using one Ofdm symbol in a transmission of a PDCCH.
Figure 3B:
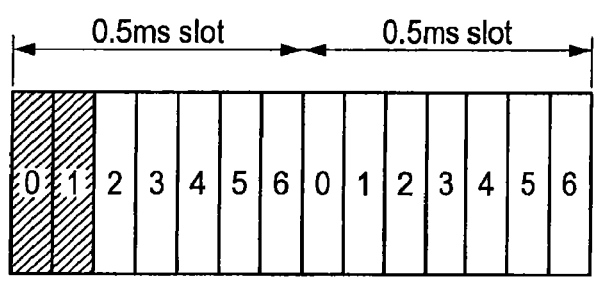
FIG. 3B is an explanatory diagram showing an example of using two Ofdm symbols in the transmission of the PDCCH.
Figure 3C:
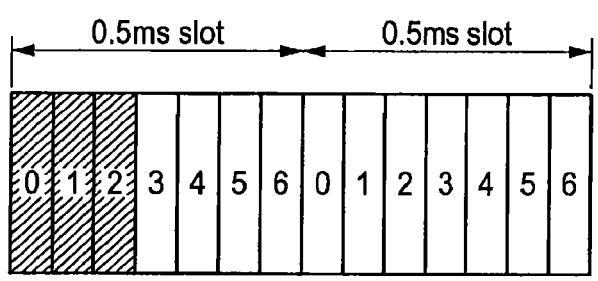
FIG. 3C is an explanatory diagram showing an example of using three Ofdm symbols in the transmission of the PDCCH.

At a head of each 1 ms sub frame shown in FIG. 2, a control signal called a PDCCH (Phy Downlink Control Channel) is added. As shown in FIG. 3A to FIG. 3C, one Ofdm symbol to three Ofdm symbols at the head of the sub frame are used for a transmission of the PDCCH. That is, there are cases in which one Ofdm symbol is used for the PDCCH transmission, and there also are cases in which three Ofdm symbols are used for the PDCCH transmission.

Notably, a region in the radio frame used for the PDCCH transmission is called a control region, and a region in the radio frame used for transmissions of a PDSCH (Phy Downlink Shared Channel) or a PUSCH (Phy Uplink Shared Channel) is called a data region.

1-3. Configuration of PDCCH

Next, control information included in the PDCCH will be described. Although various types of control information are included in the PDCCH, the following two pieces of control information are primarily included.
(1) Assigning information indicating a resource block that the UE is to receive from among the PDSCH (assign)
(2) Granting information indicating a resource block that the UE is to transmit from among the PUSCH (grant)

Figure 4:
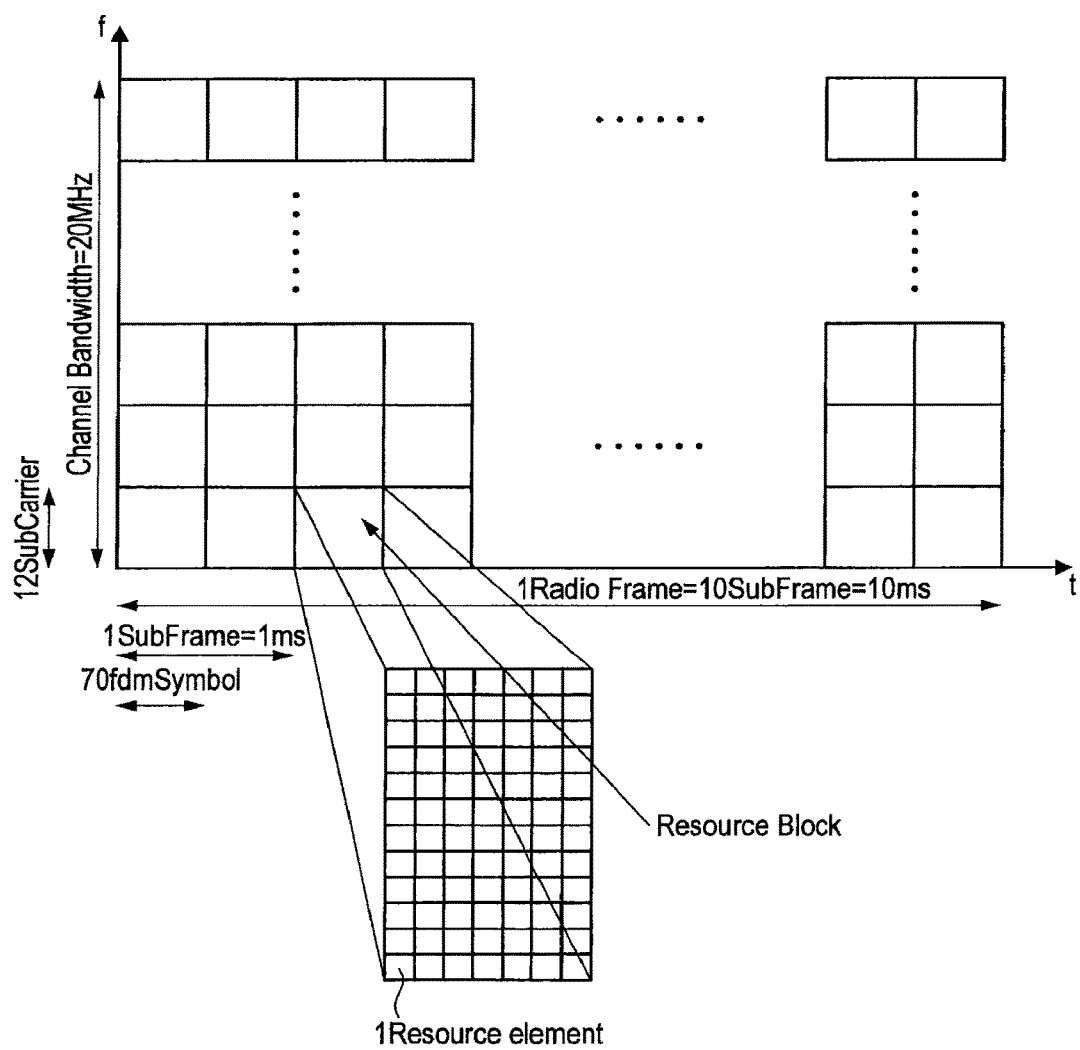
FIG. 4 is an explanatory diagram showing a resource block.

Notably, as shown in FIG. 4, a minimum unit of the resource block is twelve subcarriers×seven Ofdm symbols. Further, other than the resource information for example of assign, grant, and the like, the PDCCH further includes power control information, paging indexes, system information and the like.

1-4. Blind Decoding

The resource information such as assign and grant as above are information for each UE. Due to this, the eNodeB transmits the PDCCH so that each UE can extract the resource information addressed to itself, and each UE extracts the resource information addressed to itself from the PDCCH by a process called blind decoding. Hereinbelow, this feature will be described in detail.

In the PDCCH, the minimum unit of the control information for each UE is called CCE (Control Channel Element). The eNodeB includes the resource information for each UE, and generates CCEs identified by a C-RNTI (Cell Radio Network Temporary Identify) that is an identifier of each UE. Hereinbelow, specific examples of the CCE will be described with reference to FIG. 5.

Figure 5:
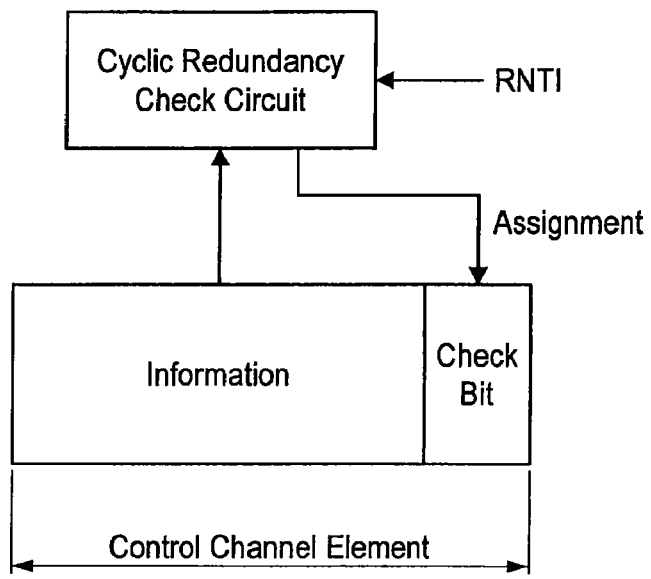
FIG. 5 is an explanatory diagram showing a specific example of a CCE.

FIG. 5 is an explanatory diagram showing a specific example of the CCE. As shown in FIG. 5, the CCE includes target information such as the resource information, as well as a check bit that is obtained by a CRC (Cyclic Redundancy Check) by masking the resource information with the C-RNTI (Cell Radio Network Temporary Identify). Here, the masking may be an exclusive disjunction calculation (XOR) of the resource information and the C-RNTI, or may be a serial coupling of the resource information and the C-RNTI.

When the PDCCH including the aforementioned plurality of CCEs is received, the UE extracts the CCE identified by its own C-RNTI by the blind decoding. Hereinbelow, a more specific description will be given with reference to FIG. 6 and FIG. 7.

Figure 6:
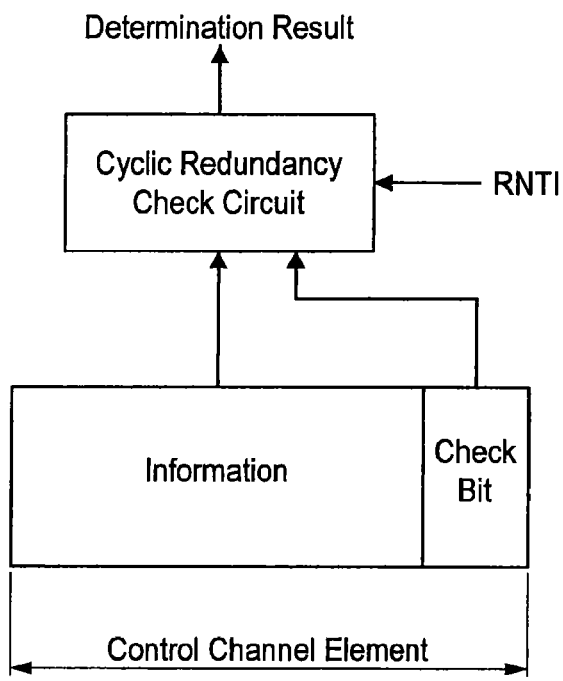
FIG. 6 is an explanatory diagram showing blind decoding.
Figure 7:
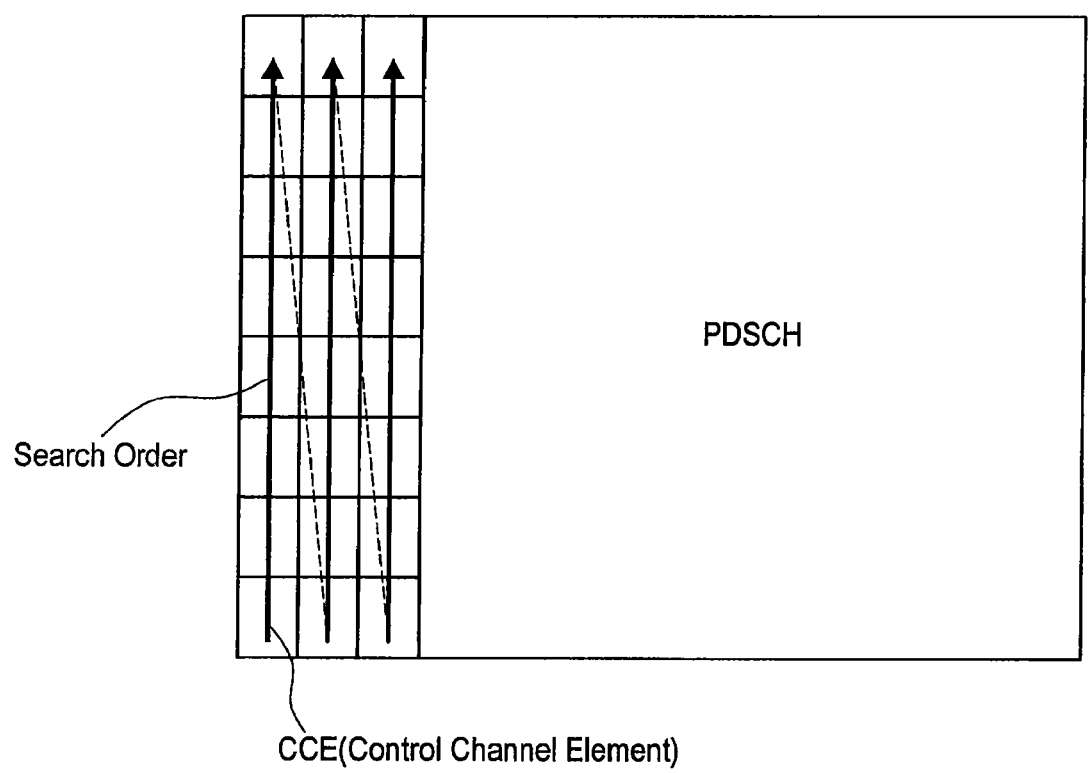
FIG. 7 is an explanatory diagram showing the blind decoding.

FIG. 6 and FIG. 7 are explanatory diagrams showing the blind decoding. As shown in FIG. 6, as the blind decoding, the UE performs CRC check by demasking each CCE with its own C-RNTI. Further, the UE performs the blind decoding on each CCE in an order shown in FIG. 7. That is, the UE performs the CRC check of each CCE on an assumption that each CCE is addressed to itself, and determines the CCE with a normal result as the CCE addressed to itself.

(CCE Aggregation)

Notably, in connection to the aforementioned CCEs, there is a concept called CCE aggregation. The CCE aggregation is a mode in which CCEs are transmitted at an amount that is one, two, four, or eight times the typical unit of the CCE.

For example, in a cell with a large cell radius, when an SN (signal to noise ratio) of a UE can be predicted to be small, the CCEs are transmitted by being repeated eight times. In this case, the check bit by the CRC is added to the result of the eight times of repetition. Accordingly, the UE performs the blind decoding by taking into account a possibility that the CCE aggregation has been performed.

Further, other than the C-RNTI, RNTIs such as a P-RNTI for acquiring information for paging and an SI-RNTI for acquiring system information exist. Accordingly, the UE performs the blind decoding by assuming by which of the RNTIs each of the CCEs is to be identified.

Particulars of Achieving the Embodiments of the Invention

Incidentally, in the 4G radio communication system, due to the introduction of the aforementioned MTC terminals, increases are expected in a number of terminals existing within each cell, a number of terminals the base station is to contain in an Active mode, and a number of terminals for the base station 10 to simultaneously control in the PDCCH. Further, the CCE included in the PDCCH also increases accompanying the increase in the number of terminals simultaneously controlled in the PDCCH.

As a result, load of the blind decoding in the UE increases due to a range requiring the blind decoding by the UE (including the MTC terminal) being broader. Especially, there are cases in which the extra-low power consumption is required in the MTC terminal, so the increase in the load of the blind decoding is problematic.

Thus, the embodiments of the invention have been created with the above circumstance as a point of concern. According to the embodiments of the invention, load of the blind decoding in the MTC terminal 20 can be suppressed. Hereinbelow, such embodiments of the invention will be described in detail.

2. DESCRIPTION OF RESPECTIVE EMBODIMENTS

As described in detail in "2-1. First embodiment" to "2-7. Seventh embodiment" by way of example, the invention can be implemented in various manners. Further, each embodiment is implemented by using an MTC-GP_RNTI which is an identifier of an MTC group assigned to the MTC terminal 20. Thus, prior to the detailed description of the respective embodiments, a method of assigning the MTC-GP_RNTI to each MTC terminal 20 will be described.
(Assigning MTC-GP_RNTI)

Figure 8:
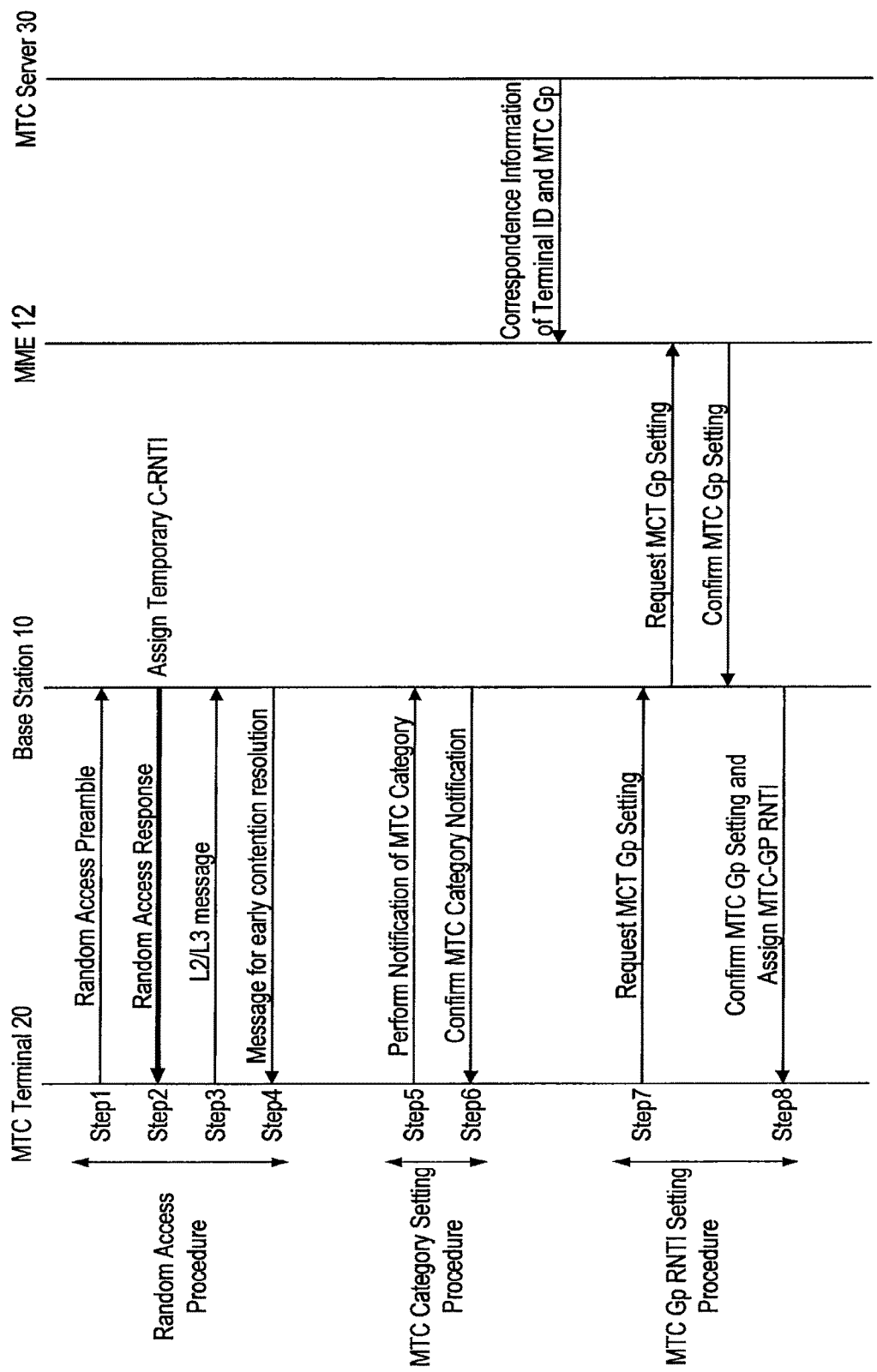
FIG. 8 is a sequence diagram showing an example of a method of assigning C-RNTI and MTC-GP_RNTI.

FIG. 8 is a sequence diagram showing an example of a method of assigning C-RNTI and MTC-GP_RNTI. As shown in FIG. 8, firstly, in a random access procedure formed of Step 1 to Step 4, the C-RNTIs are assigned to each MTC terminal 20.

More specifically described, the MTC terminal 20 transmits a preamble to a random access window in a radio frame (Step 1). In successfully receiving the preamble from the MTC terminal 20, the base station 10 transmits a random access response to the MTC terminal 20 (Step 2). The base station 10 assigns a Temporary C-RNTI to the MTC terminal 20 in this random access response.

Then, when the random access response is received, the MTC terminal 20 transmits an L2/L3 message to the base station 10 (Step 3). In connection to the above, the MTC terminal 20 determines that a random access had been successful by receiving a contention resolution message transmitted from the base station 10 (Step 4), and begins using the Temporary C-RNTI assigned in Step 2 as the C-RNTI.

Thereafter, an MTC category setting procedure formed of Step 5 and Step 6 is performed. More specifically described, since the MTC terminal 20 is set with information of an MTC category indicating whether the MTC terminal 20 itself is an MTC terminal or not, the MTC terminal 20 is aware that itself is an MTC terminal. Due to this, the MTC terminal 20 notifies the base station 10 of the MTC category (Step 5), and receives a notification confirming signal from the base station 10 (Step 6). Notably, the MTC category may include information indicating a capacity of the MTC terminal 20, such as whether the MTC terminal 20 is compliant with a long sleep mode for over one month or not.

Further, in an MTC-GP_RNTI setting procedure formed of Step 7 and Step 8, the MTC-GP_RNTI is assigned to the MTC terminal 20. More specifically described, the MTC terminal 20 performs an MTC group setting request to the base station 10 (Step 7). The base station 10 transfers the aforementioned setting request to the MME 12 together with a terminal ID of the MTC terminal 20 (a unique number described in an SIM, and is different from the RNTI).

The MME 12 is a device that handles the unique information of the terminals, receives correspondence information of an MTC group and the terminal IDs of the terminals that are granted to enter the MTC group from the MTC server 30, and retains the correspondence information. The MME 12 determines whether an MTC terminal 20 having the terminal ID transferred from the base station 10 is allowed to enter the MTC group or not based on the correspondence information, and if the MTC terminal 20 is allowed to enter, the MME 12 transmits an MTC group setting confirming signal to the base station 10.

Subsequently, the base station 10 transmits the MTC-GP_RNTI to the MTC terminal 20 together with the MTC group setting confirming signal (Step 8). Then, the MTC terminal 20 becomes capable of using the MTC-GP_RNTI by receiving the MTC group setting confirming signal and the MTC-GP_RNTI from the base station 10.

The method of assigning the MTC-GP_RNTI is described above, however, the method of assigning the MTC-GP_RNTI is not limited to the above example. For example, information such as an AC (Access Class) that is predeterminedly set in the MTC terminal 20 may be used as the MTC-GP_RNTI, and the MTC-GP_RNTI may be assigned to the MTC terminal 20 by a human operation.

2-1. First Embodiment

Next, the first embodiment of the invention will be described with reference to FIG. 9 to FIG. 13.

Base Station of First Embodiment

Figure 9:
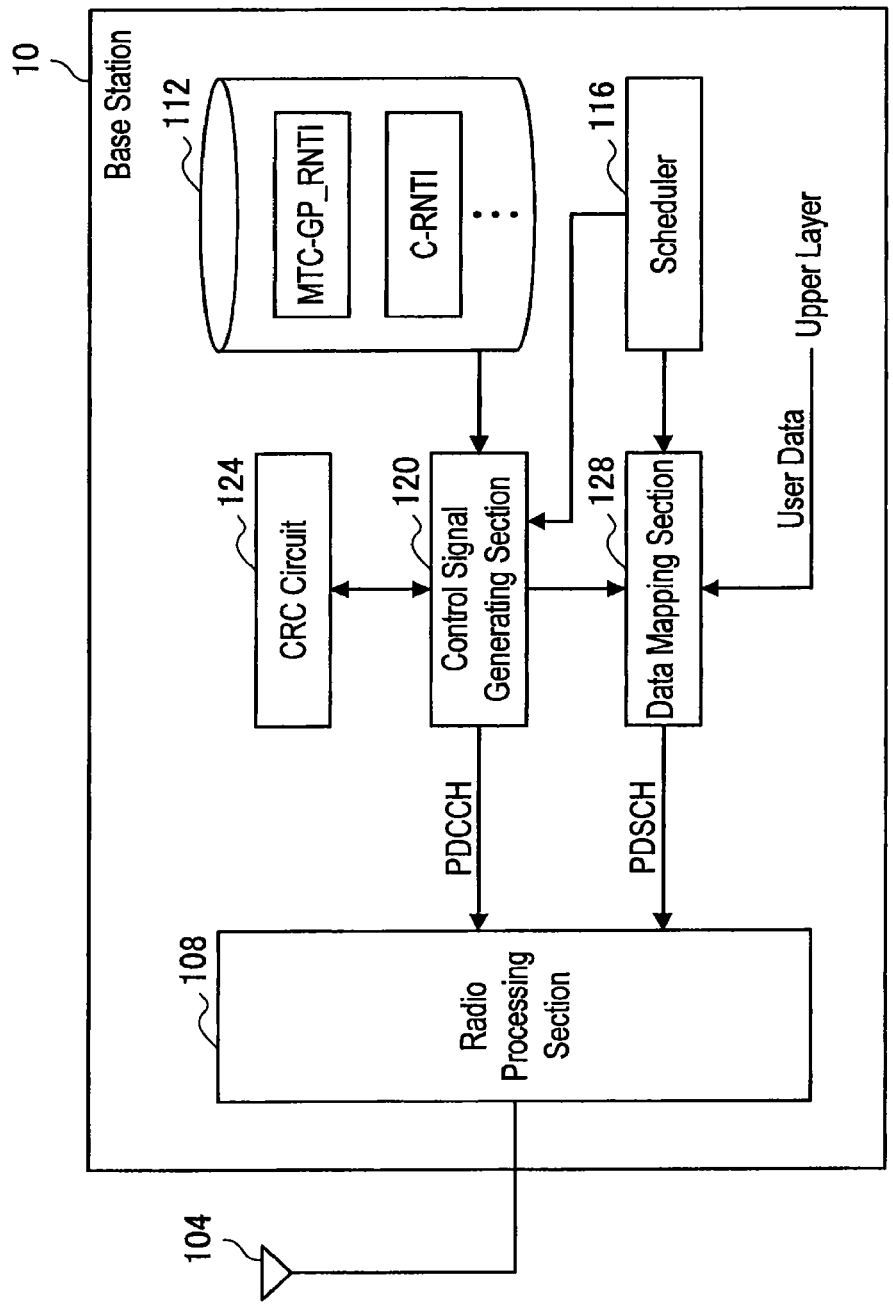
FIG. 9 is an explanatory diagram showing a configuration of a base station of a first embodiment of the invention.

FIG. 9 is an explanatory diagram showing a configuration of a base station 10 of the first embodiment of the invention. As shown in FIG. 9, the base station 10 of the first embodiment includes an antenna 104, a radio processing section 108, a storage section 112, a scheduler 116, a control signal generating section 120, a CRC circuit 124, and a data mapping section 128.

The antenna 104 functions as a transmitter section that transmits a transmitter signal such as a PDCCH (control signal) and a PDSCH (data signal) supplied from the radio processing section 108 as a radio signal, and as a receiver section that converts the radio signal transmitted from a radio communication device such as an MTC terminal 20 into an electric receiver signal, and supplies the receiver signal to the radio processing section 108. Notably, in FIG. 9, although an example in which the base station 10 includes one antenna is shown, the base station 10 may include a plurality of antennas. In this case, the base station 10 is capable of realizing an MIMO (Multiple Input, Multiple Output) communication, a diversity communication and the like.

The radio processing section 108 performs radio processes for transmission such as modulation, DA conversion, filtering, amplification, and up-conversion of the transmitter signal such as the PDCCH supplied from the control signal generating section 120, the PDSCH supplied from the data mapping section, and the like. Further, the radio processing section 108 performs radio processes for reception such as down-conversion, filtering, DA conversion, and demodulation of the receiver signal supplied from the antenna 104.

The storage section 112 stores the MTC-GP_RNTIs, the C-RNTIs and the like that are assigned to the respective MTC terminals 20. Further, although depiction is omitted in FIG. 9, the storage section 112 also stores other RNTIs such as SI-RNTIs, P-RNTIs, and RA-RNTIs.

The scheduler 116 allots a resource to each MTC terminal 20 for data communication. That is, the scheduler 116 allots resource blocks among the PDSCH that the respective MTC terminals 20 are to receive, and resource blocks among the PUSCH that the respective MTC terminals 20 are to transmit.

The control signal generating section 120 generates a PDCCH formed of a plurality of CCEs. To describe in further detail, the control signal generating section 120 generates a CCE including information indicating a second search space arranged within data region (reference information) and a check bit obtained by the CRC circuit 124 by masking the aforesaid information by the MTC-GP_RNTI. Here, the masking may be an exclusive disjunction calculation (XOR) of the information indicating the second search space and the MTC-GP_RNTI, or may be a serial coupling of the information indicating the second search space and the C-RNTI. According to the above configuration, an MTC terminal 20 within an MTC group to which the MTC-GP_RNTI is assigned can be designated as a destination of the information indicating the second search space.

Notably, although an example in which the check bit corresponding to the information indicating the second search space is added to designate the destination of the CCE is described above, a method of designating the destination of the CCE is not limited to the above example. For example, the control signal generating section 120 may designate the designation of the CCE simply by attaching the MTC-GP_RNTI to the information indicating the second search space.

Further, the control signal generating section 120 generates information for mapping in the second search space, and supplies the same to the data mapping section 128 together with information indicating a position of the second search space. Here, the information for mapping in the second search space is the resource information for the respective MTC terminals 20 within the MTC group to which the MTC-GP_RNTI is assigned. Further, a check bit obtained by the CRC circuit 124 by masking the aforesaid information with the C-RNTIs of the respective MTC terminals 20 is added to the resource information for the respective MTC terminals 20.

The data mapping section 128 (data signal generating section) maps user data for each MTC terminal 20 supplied from an upper layer in the resource block allotted by the scheduler 116 among the PDSCH that the respective MTC terminals 20 are to receive. Further, the data mapping section 128 maps the resource information of the respective MTC terminals 20 supplied from the control signal generating section 120 in the second search space. Hereinbelow, a disposition relationship of the CCE, the second search space, the allotted resource and the like will be described more specifically with reference to FIG. 10.

Figure 10:
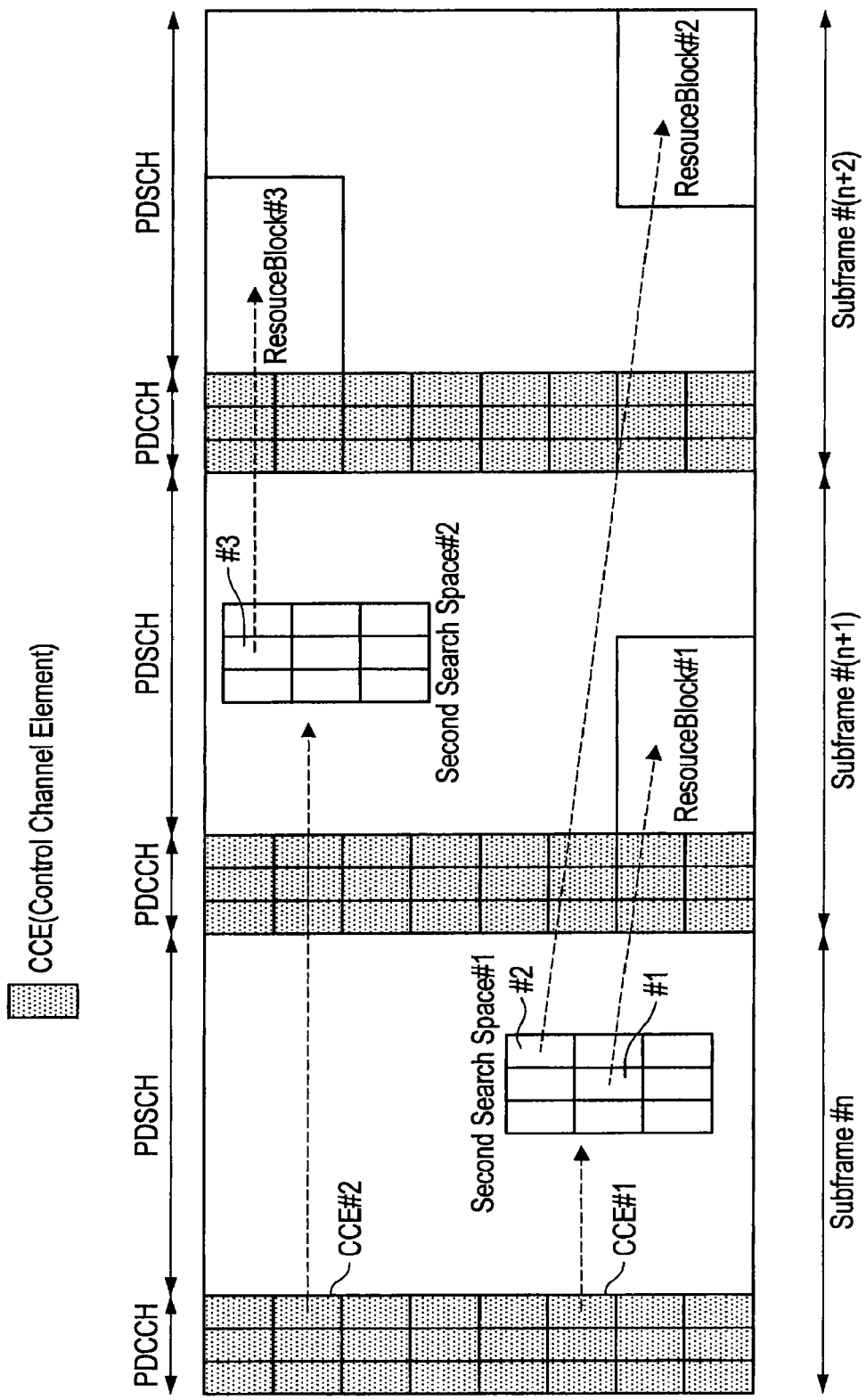
FIG. 10 is an explanatory diagram showing a dispositional relationship of a CCE, a second search space, and an allotted resource.

FIG. 10 is an explanatory diagram showing the disposition relationship of the CCE, the second search space, and the allotted resource. In the example shown in FIG. 10, a CCE #1 describes information indicating a position of a second search space #1 for an MTC group having an MTC-GP_RNTI corresponding to a check bit added to the CCE #1.

Then, among a plurality of resource information included in the second search space #1, for example, resource information #1 indicates a resource block #1 for the MTC terminal 20 having a C-RNTI corresponding to a check bit added to the resource information #1. Further, the resource information #2 indicates a resource block #2 for the MTC terminal 20 having a C-RNTI corresponding to a check bit added to the resource information #2.

Similarly, a CCE #2 shown in FIG. 10 describes information indicating a position of a second search space #2 for an MTC group having an MTC-GP_RNTI corresponding to a check bit added to the CCE #2. Further, of a plurality of resource information included in the second search space #2, for example, resource information #3 indicates a resource block #3 for the MTC terminal 20 having a C-RNTI corresponding to a check bit added to the resource information #3.

Notably, the CCE and the second search space may be disposed in the same sub frame as with the CCE #1 and the second search space #1, or may be disposed in different sub frames as with the CCE #2 and the second search space #2. Such a relationship of the CCE and the second search space may fixedly be set by signaling in advance, or may be designated by the CCE.

Further, since processing cannot be performed timely if the resource blocks indicated by the respective resource information included in the second search space are in the same sub frame as the second search space, the resource blocks are disposed in a sub frame that is after the sub frame of the second search space, such as with the resource block #1 and the resource block #2. Such a relationship of the second search space and the allotted resource blocks of the respective MTC terminals 20 may fixedly be set by signaling in advance, or may be designated by the second search space.

MTC Terminal of First Embodiment

Hereabove, the configuration of the base station 10 of the first embodiment of the invention was described. Now, a configuration of the MTC terminal 20 of the first embodiment of the invention will be described.

Figure 11:
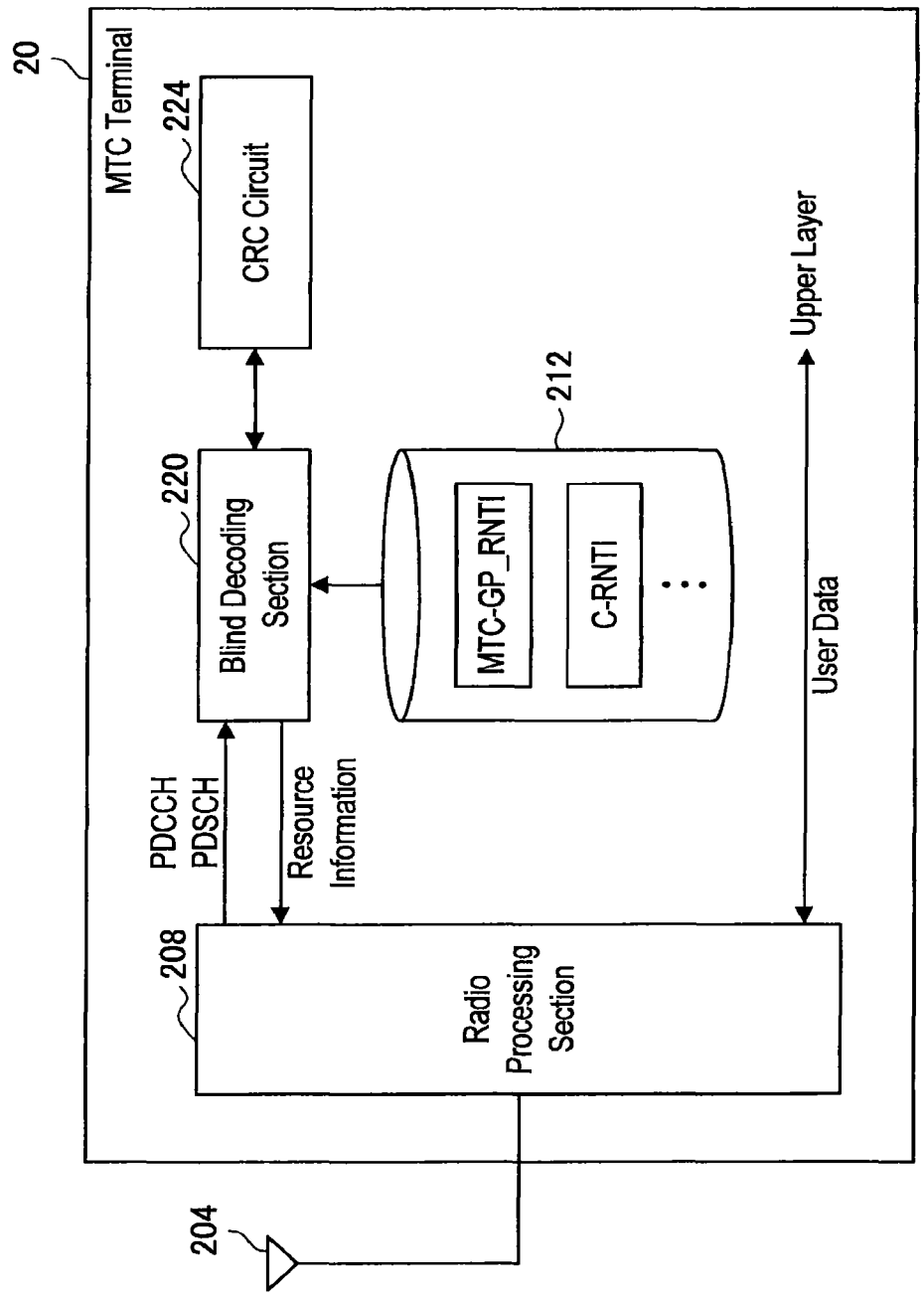
FIG. 11 is an explanatory diagram showing a configuration of an MTC terminal of the first embodiment.

FIG. 11 is an explanatory diagram showing the configuration of the MTC terminal 20 of the first embodiment. As shown in FIG. 11, the MTC terminal 20 of the first embodiment includes an antenna 204, a radio processing section 208, a storage section 212, a blind decoding section 220, and a CRC circuit 224.

The antenna 204 functions as a transmitter section that transmits a transmitter signal such as a PUSCH (data signal) supplied from the radio processing section 208 as a radio signal, and as a receiver section that converts the radio signal such as the PDCCH and the PDSCH transmitted from a base station 10 into an electric receiver signal, and supplies the receiver signal to the radio processing section 208. Notably, in FIG. 11, although an example in which the MTC terminal 20 includes one antenna is shown, the MTC terminal 20 may include a plurality of antennas. In this case, the MTC terminal 20 is capable of realizing an MIMO (Multiple Input, Multiple Output) communication, a diversity communication and the like.

The radio processing section 208 performs radio processes for transmission such as modulation, DA conversion, filtering, amplification, and up-conversion of user data supplied from an upper layer. Further, the radio processing section 208 performs radio processes for reception such as down-conversion, filtering, DA conversion, and demodulation of the receiver signal supplied from the antenna 104.

The storage section 212 stores for example the MTC-GP_RNTIs, the C-RNTIs and the like that are assigned from the base station 10. Further, although depiction is omitted in FIG. 11, the storage section 212 also stores other RNTIs such as SI-RNTI, P-RNTI, and RA-RNTI.

When the PDCCH is supplied from the radio processing section 208, the blind decoding section 220 (acquiring section) extracts the CCE identified by the MTC-GP_RNTI assigned to the MTC terminal 20 by the blind decoding. More specifically described, the blind decoding section 220 operates in cooperation with the CRC circuit 224 to perform CRC check by demasking each CCE by the MTC-GP_RNTI assigned to the MTC terminal 20. Then, the blind decoding section 220 extracts the CCE with a normal result, and specifies the second search space based on the information described in the CCE. For example, the blind decoding section 220 extracts the CCE #1 shown in FIG. 10 from the PDCCH, and specifies the second search space #1 based on the information described in the CCE #1.

Further, when the PDSCH is supplied from the radio processing section 208, the blind decoding section 220 acquires the resource information addressed to itself by performing the blind decoding using the C-RNTI on the second search space specified from the CCE. More specifically, the blind decoding section 220 operates in cooperation with the CRC circuit 224 to perform CRC check by demasking each resource information in the second search space using the C-RNTI. Then, the blind decoding section 220 acquires the resource information with a normal result as the resource information addressed to itself. Thereafter, the radio processing section 208 performs the transmission process or the reception process in the resource block indicated by the resource information. For example, the blind decoding section 220 acquires the resource information #1 in the second search space #1 shown in FIG. 10 as the resource information addressed to itself. Thereafter, the radio processing section 208 performs the reception process in the resource block #1 indicated by the resource information #1.

As described above, according to the first embodiment of the invention, by mapping the resource information (assign, grant) for each MTC terminal 20 in the PDSCH, the resource information for a large number of MTC terminals 20 can be contained. Further, since a number of the CCEs in the PDCCH can be suppressed, the search space in which the MTC terminal 20 performs the blind decoding can be reduced. As a result, load related to the blind decoding in the MTC terminal 20 can be reduced. Notably, although an example in which the resource information for the respective MTC terminals 20 are mapped in the second search space was described above, the first embodiment is not limited to this example. For example, communication controlling information for each MTC terminal 20 such as transmission power and transmission rate, and other various types of information for each MTC terminal 20 may be mapped in the second search space.

Operation of First Embodiment

Hereabove, the configuration of the MTC terminal 20 of the first embodiment of the invention was described. Next, an operation of the radio communication system 1 of the first embodiment of the invention will be described.

Figure 12:
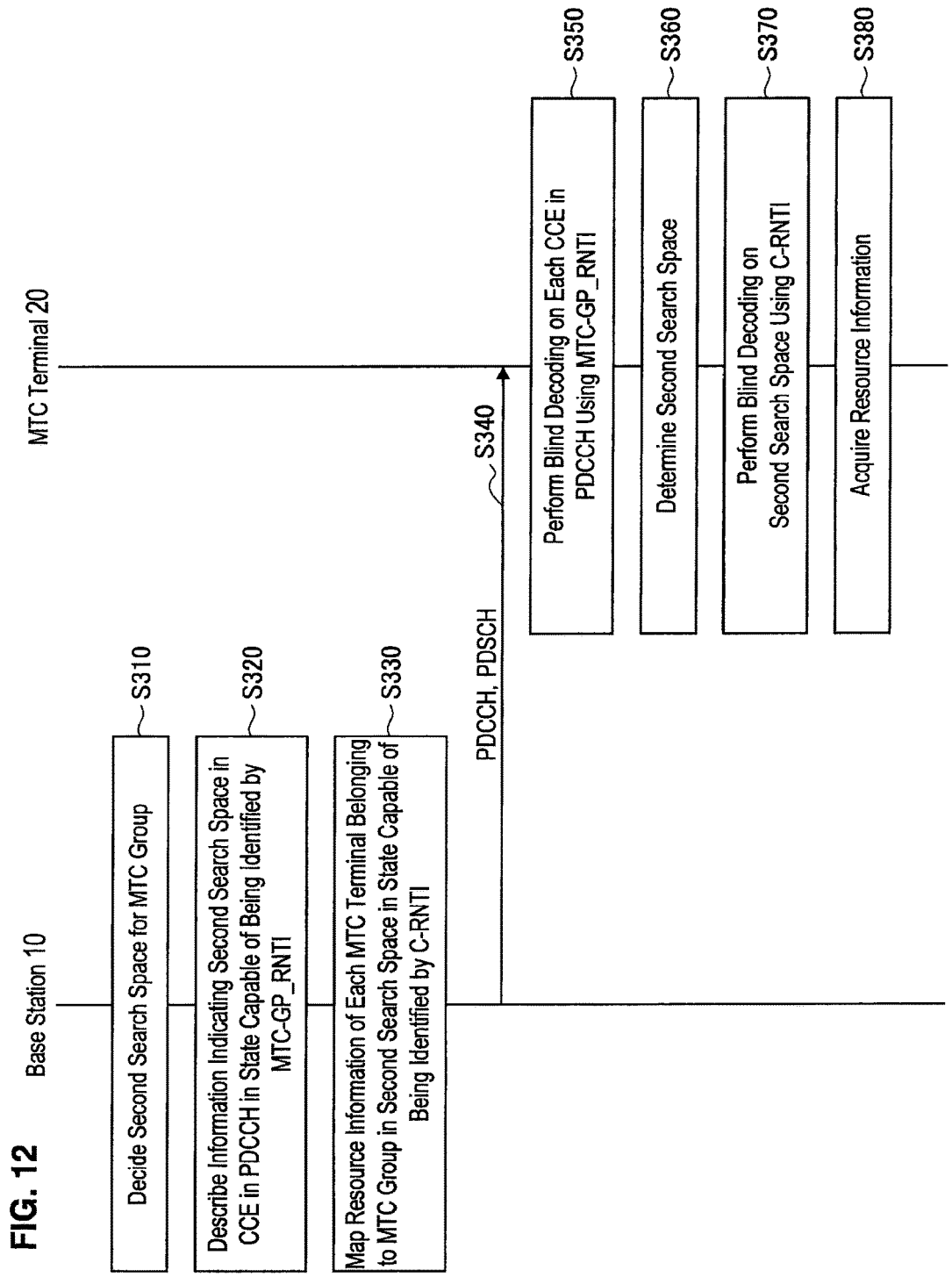
FIG. 12 is a sequence diagram showing an operation of the radio communication system of the first embodiment of the invention.

FIG. 12 is a sequence diagram showing the operation of the radio communication system 1 of the first embodiment of the invention. The base station 10 firstly decides a second search space for one MTC group (S310). Then, the control signal generating section 120 of the base station 10 describes information indicating the decided second search space in the CCE in the PDCCH in a state capable of being identified by MTC-GP_RNTI assigned to the MTC group (S320). More specifically, the control signal generating section 120 adds a check bit obtained by the CRC circuit 124 by masking the information indicating the second search space with the MTC-GP_RNTI to the CCEs.

Further, the data mapping section 128 of the base station 10 maps the resource information for each MTC terminal 20 belonging to the MTC group in the second search space of the PDSCH in a state capable of being identified by C-RNTI assigned to each MTC terminal 20 (S330). Thereafter, the base station 10 transmits the PDCCH and the PDSCH (S340).

Then, when the MTC terminal 20 receives the PDCCH from the base station 10, the blind decoding section 220 of the MTC terminal 20 performs the blind decoding on the respective CCEs in the PDCCH using the MTC-GP_RNTI assigned to itself (S350), and specifies the second search space for the MTC group including the terminal itself (S360).

Further, when the MTC terminal 20 receives the PDSCH from the base station 10, the blind decoding section 220 of the MTC terminal 20 performs the blind decoding on the second search space in the PDSCH using the C-RNTI (S370), and acquires the resource information for the terminal itself (S380). Thereafter, the MTC terminal 20 performs the reception process or the transmission process in the resource block indicated by the acquired resource information.

Supplementation of First Embodiment

As described above, the base station 10 of the first embodiment of the invention transmits the PDCCH by describing the information indicating the second search space in the CCEs in the state capable of being identified by the MTC-GP_RNTI. However, a case in which the base station 10 transmits the PDCCH by describing the resource information for the MTC terminal 20 in the CCEs in a state capable of being identified by the C-RNTI of the MTC terminal 20 may also be possible.

Thus, the MTC terminal 20 may perform the blind decoding of the PDCCH by using both the MTC-GP_RNTI and the C-RNTI. Even in the case of performing the blind decoding of the PDCCH by using both the MTC-GP_RNTI and the C-RNTI, since the search space is made small according to the first embodiment of the invention, load on the MTC terminal 20 can be suppressed sufficiently.

Alternatively, in a case where it is determined that the base station 10 cannot handle the MTC-GP_RNTI, the MTC terminal 20 may perform the blind decoding by using only the C-RNTI. Notably, as the case in which the base station 10 cannot handle the MTC-GP_RNTI, a case in which the MTC terminal 20 is connected to a new base station 10 by a hand-over, or a case in which the base station 10 does not have a capability to handle the MTC-GP_RNTI is expected.

Alternatively, as will be described with reference to FIG. 13, the MTC terminal 20 may change the RNTI to be used in the blind decoding by requesting a setting change to the base station 10.

Figure 13:
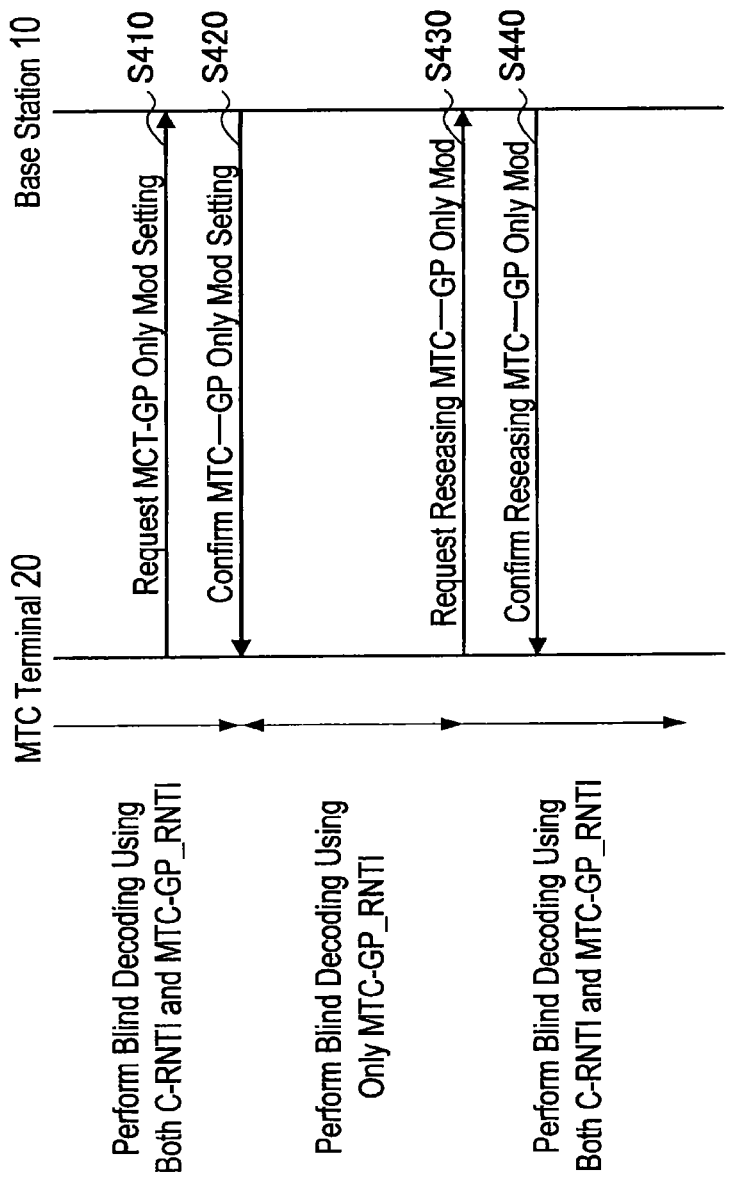
FIG. 13 is a sequence diagram showing an example of a method of changing an RNTI used for the blind decoding.

FIG. 13 is a sequence diagram showing an example of a method of changing the RNTI used for the blind decoding. As shown in FIG. 13, in the case where the MTC terminal 20 performs the blind decoding of the PDCCH by using both the MTC-GP_RNTI and the C-RNTI, a setting request of MTC-GP_Only_Mod can be transmitted to the base station 10 (S410).

When the setting request is received, the base station 10 sets the MTC-GP_Only_Mod that describes the information indicating at least the second search space for the MTC group to which the MTC terminal 20 belongs in the CCE in a state capable of being identified by the MTC-GP_RNTI. Then, the base station 10 transmits a setting confirming signal of the MTC-GP_Only_Mod to the MTC terminal 20 (S420). Notably, the base station 10 may transmit the setting confirming signal of the MTC-GP_Only_Mod to all of the MTC terminals belonging to the MTC group.

After receiving the setting confirming signal of the MTC-GP_Only_Mod, the MTC terminal 20 performs the blind decoding by using only the MTC-GP_RNTI.

Thereafter, when the MTC terminal 20 transmits a release request of the MTC-GP_Only_Mod to the base station 10, (S430), the base station 10 releases the setting of the MTC-GP_Only_Mod, and transmits a release confirming signal of the MTC-GP_Only_Mod to the MTC terminal 20 (S440). After having received the release confirming signal of the MTC-GP_Only_Mod, the MTC terminal 20 again performs the blind decoding of the PDCCH using both the MTC-GP_RNTI and the C-RNTI.

2-2. Second Embodiment

Hereabove, the first embodiment of the invention was described. Now, a second embodiment of the invention will be described. Notably, since the second embodiment to the seventh embodiment described below have a large number of portions in common with the first embodiment, detailed descriptions for the portions in common with the first embodiment will be omitted. Further, the second embodiment to the seventh embodiment will be described by reusing the configurational diagram of the base station 10 shown in FIG. 9 and the configurational diagram of the MTC terminal 20 shown in FIG. 11.

Figure 14:
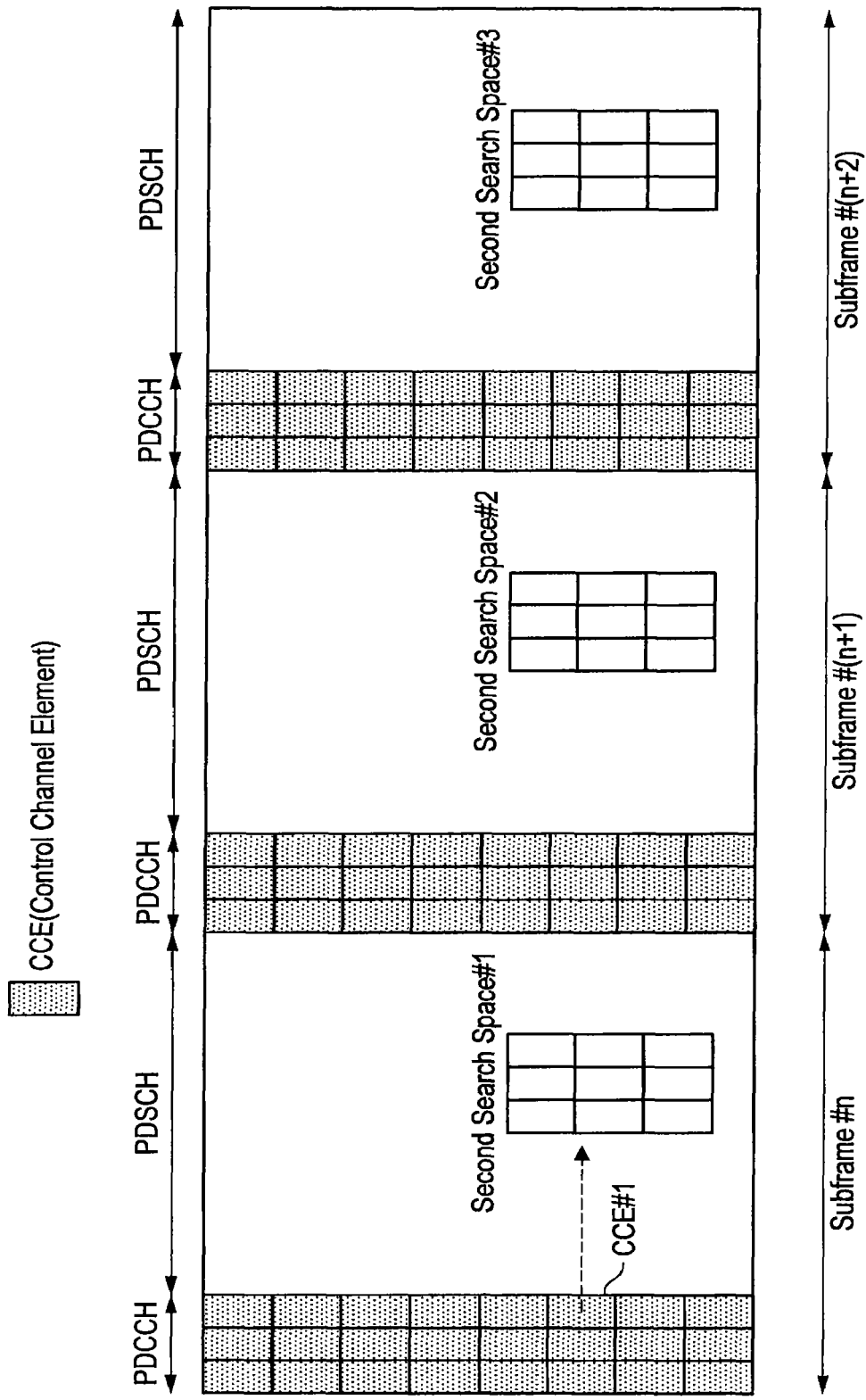
FIG. 14 is an explanatory diagram showing an example of disposition of the second search space for a certain MTC group.

FIG. 14 is an explanatory diagram showing an example of disposition of the second search space for a certain MTC group. As shown in FIG. 14, a base station 10 may dispose second search spaces #1 to #3 at a same position that one CCE #1 indicates over a plurality of sub frames.

In this case, an MTC terminal 20 needs to know over how many sub frames the second search spaces are to be disposed at the same position. Due to this, the base station 10 may notify a number of the sub frames in CCE, or may notify the number of the sub frames to the MTC terminal 20 in advance.

According to this second embodiment, since the number of the CCEs in PDCCH can further be reduced, load related to blind decoding on the MTC terminal 20 can further be reduced.

2-3. Third Embodiment

As described with reference to FIG. 7, typically, after searching CCE in PDCCH in a frequency direction, an MTC terminal 20 searches the following Ofdm symbol again in the frequency direction. Due to this, in an LTE, a search in the frequency direction with a minimum width of 5 MHz and a maximum width of 20 MHz is required.

However, from viewpoints that the MTC terminal 20 in some cases is required to have an extra low power consumption, and of an operation efficiency of a digital circuit, it is effective to make the search width in the frequency direction be 5 MHz or less, for example, 1 MHz or less.

Thus, the base station 10 of the third embodiment disposes the CCEs for the same MTC group in a predetermined sub carrier. Hereinbelow, specific descriptions will be given with reference to FIG. 15.

Figure 15:
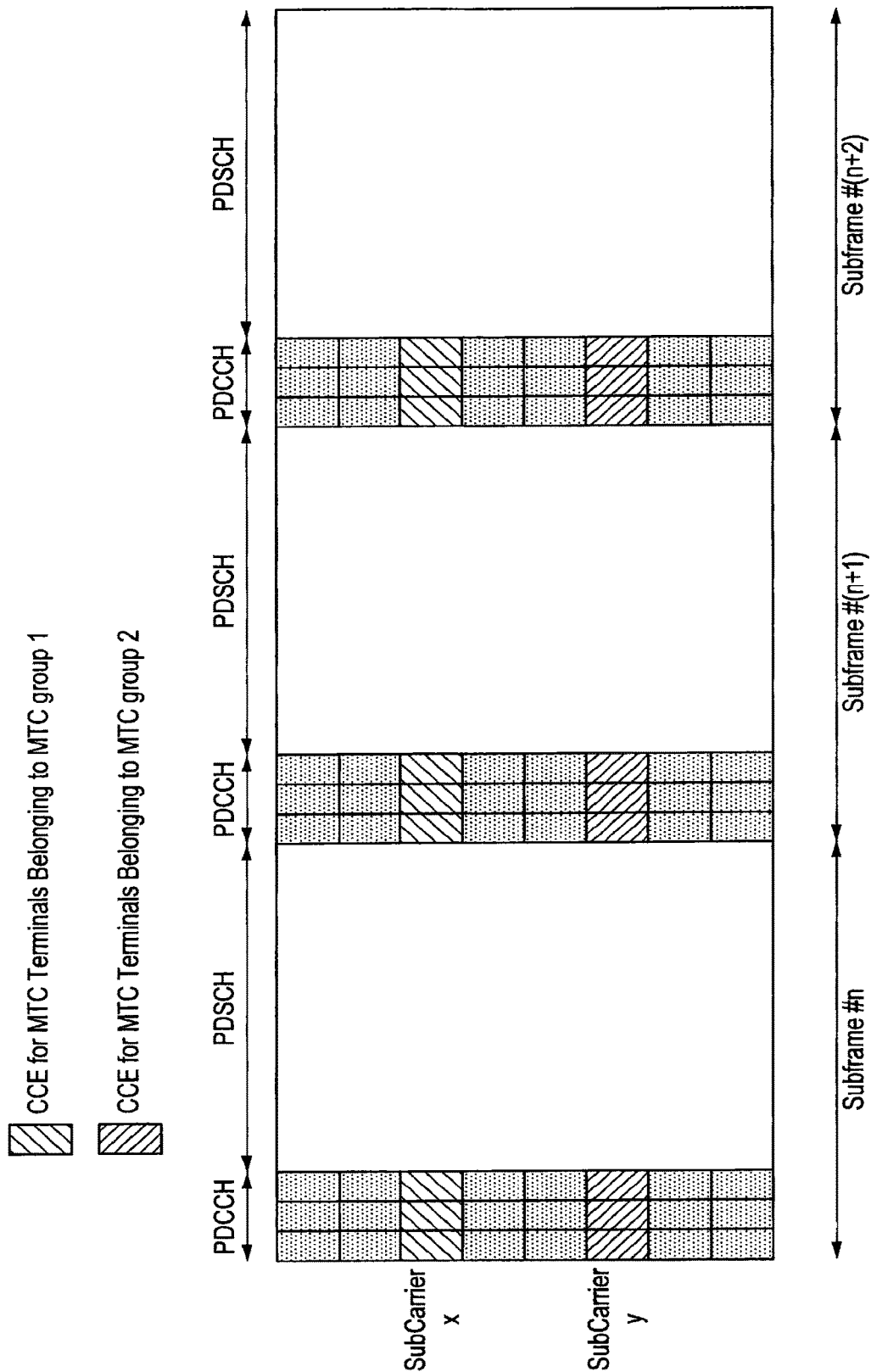
FIG. 15 is an explanatory diagram showing an example of disposition of the CCE for each MTC group.

FIG. 15 is an explanatory diagram showing an example of disposition of the CCEs for each MTC group. As shown in FIG. 15, the base station 10 of the third embodiment for example disposes CCE for an MTC terminal 20 belonging to an MTC group 1 in a sub carrier x, and disposes CCE for an MTC terminal 20 belonging to an MTC group 2 in a sub carrier y. Notably, the base station 10 may notify the MTC terminals 20 in advance of information indicating which sub carrier the CCE for each MTC group is going to be disposed in.

According to the above configuration, the MTC terminal 20 belonging to the MTC group 1 can simply perform the blind decoding only on the sub carrier x in a time direction, and the MTC terminal 20 belonging to the MTC group 2 can simply perform the blind decoding only on the sub carrier y in the time direction. Thus, according to the third embodiment, load related to the blind decoding in the MTC terminal 20 can significantly be reduced.

2-4. Fourth Embodiment

In the above embodiment, an example in which the MTC terminals 20 belong to one MTC group and one MTC-GP_RNTI is assigned was described. On the other hand, a case in which the MTC terminals 20 are grouped separately for uplink and downlink is also expected. The fourth embodiment focuses on this feature, and MTC terminals 20 of the fourth embodiment belong to a plurality of MTC groups, and a plurality of MTC-GP_RNTIs are assigned. Hereinbelow, a specific example will be described with reference to FIG. 16.

Figure 16:
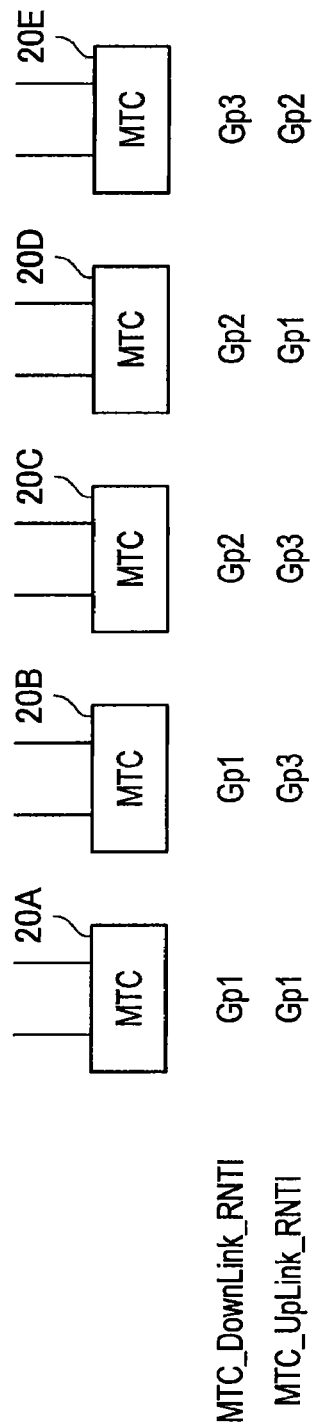
FIG. 16 is an explanatory diagram showing a specific example of an MTC group to which MTC terminals belong.

FIG. 16 is an explanatory diagram showing a specific example of an MTC group to which MTC terminals 20 belong. As shown in FIG. 16, the MTC terminals 20 of the fourth embodiment belong to an uplink MTC group and a downlink MTC group. For example, an MTC terminal 20A belongs to a downlink MTC group 1 and an uplink MTC group 1, and an MTC terminal 20B belongs to the downlink MTC group 1 and an uplink MTC group 3.

Due to this, MTC-DownLink_RNTI that is a downlink group identifier and MTC-UpLink_RNTI that is an uplink group identifier are assigned to each MTC terminal 20.

In this case, a base station 10 generates the CCE including information indicating a second search space for the uplink by using the MTC-UpLink_RNTI, and generates the CCE including information indicating a second search space for the downlink by using the MTC-DownLink_RNTI.

Figure 17:
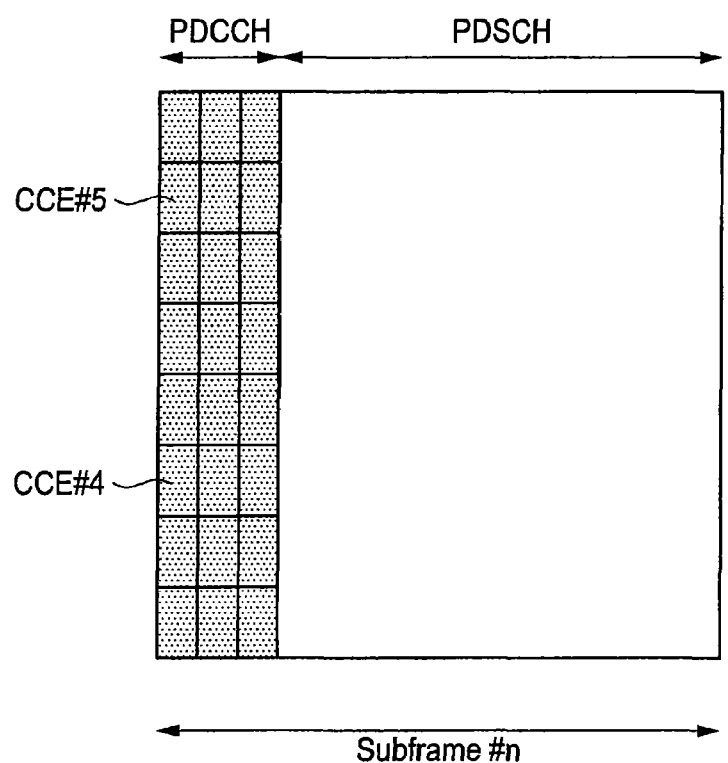
FIG. 17 is an explanatory diagram corresponding to a fourth embodiment.

For example, in a case of describing the information indicating the second search space for the uplink MTC group 1 in the CCE #4 shown in FIG. 17, the base station 10 generates the CCE #4 by using the MTC-UpLink_RNTI assigned to the uplink MTC group 1. Similarly, in a case of describing the information indicating the second search space for the downlink MTC group 2 in the CCE #5 shown in FIG. 17, the base station 10 generates the CCE #5 by using the MTC-DownLink_RNTI assigned to the downlink MTC group 2.

Due to this, the MTC terminal 20 can extract the CCE for the MTC group to which the MTC terminal 20 belongs by performing blind decoding on each CCE in the PDCCH by using the MTC-DownLink_RNTI and the MTC-UpLink_RNTI.

2-5. Fifth Embodiment

As described above, the first embodiment to the fourth embodiment make the search space in the PDCCH small by using the second search space. With respect to this, the fifth embodiment to the seventh embodiment described below make the search space in the PDCCH small by describing the resource information shared by a plurality of MTC terminals 20 configuring an MTC group in the CCE. Hereinbelow, the fifth embodiment to the seventh embodiment will orderly be described.

(Sharing Downlink Resource Information)

As applications of an MTC terminal 20, applications for reporting accumulated information such as reporting sales performance of a vending machine, reporting used amount of gas or water are primarily expected. In such cases, a base station 10 can use a common command for instructing a plurality of MTC terminals 20 to report the accumulated information.

Thus, the base station 10 describes resource information indicating a resource block to which the plurality of MTC terminals 20 in an MTC group is to perform a reception process in the CCE. Further, the base station 10 transmits the CCE in a state capable of being identified by MTC-GP_RNTI by adding a check bit based on the MTC-GP_RNTI assigned to the MTC group to the CCEs.

Then, the plurality of MTC terminals 20 in the MTC group performs blind decoding using the MTC-GP_RNTI, and extracts the CCE identified by the MTC-GP_RNTI. Further, the plurality of MTC terminals 20 in the MTC group simultaneously performs the reception process in the resource block indicated by the resource information described in the extracted CCE.

According to the above configuration, since the resource information to the respective MTC terminals 20 does not need to be described in different CCEs, the search space in the PDCCH can further be made smaller.

(Sharing Uplink Resource Information)

In an uplink, if the plurality of MTC terminals 20 performs a transmission process in the same resource block, uplink data collapses at the base station 10. Thus, the base station 10 describes resource information indicating a reference resource block for the uplink of the MTC group in the CCE. Further, the base station 10 transmits the CCE in a state capable of being identified by MTC-GP_RNTI by adding a check bit based on the MTC-GP_RNTI assigned to the MTC group to the CCEs.

Then, the plurality of MTC terminals 20 in the MTC group performs blind decoding using the MTC-GP_RNTI, and extracts the CCE identified by the MTC-GP_RNTI. Further, the plurality of MTC terminals 20 in the MTC group specifies the reference resource block indicated by the resource information described in the extracted CCE, and performs the transmission process in the resource block that is in a positional relationship with the reference resource block as set in advance. Hereinbelow, this feature will be described more specifically with reference to FIG. 18.

Figure 18:
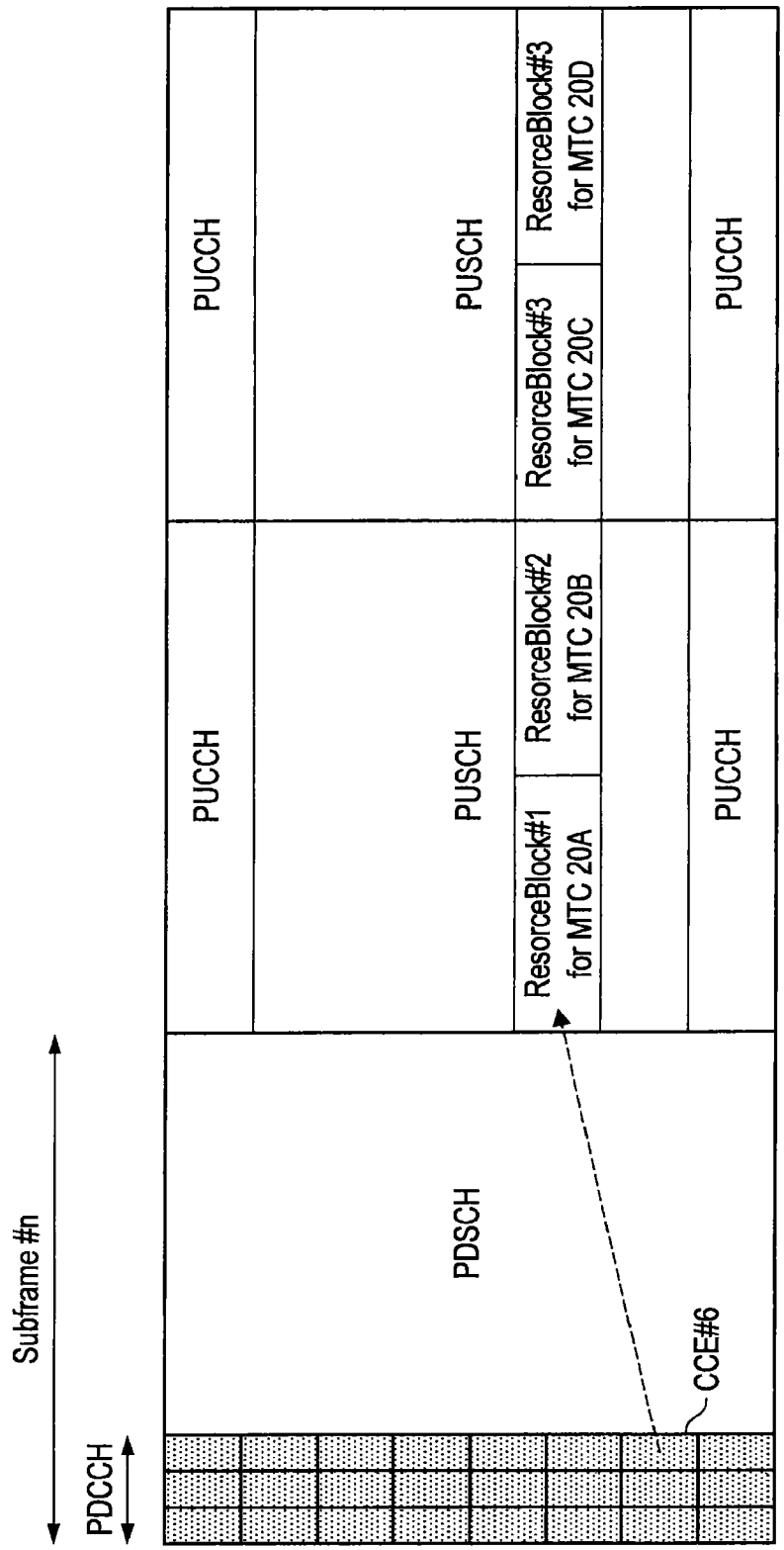
FIG. 18 is an explanatory diagram showing a relationship of a reference resource block and an uplink resource block of each MTC terminal.

FIG. 18 is an explanatory diagram showing a relationship of a reference resource block and an uplink resource block of each MTC terminal 20. As shown in FIG. 18, for example, resource information indicating a resource block #1 as the reference resource block of the uplink of a MTC group 1 is described in CCE #6.

Here, it is assumed that the MTC group 1 is configured of MTC terminals 20A to 20D, and a relative position of a resource block to be used for the uplink by each MTC terminal 20 from the reference resource block is set. In this case, the MTC terminals 20A to 20D specify the resource block #1 that is the reference resource block, and perform the transmission process by using the resource block that is at the set relative position from the reference resource block.

For example, a case of a setting in which the reference resource block is an origin, and resource blocks that are adjacent in a time direction are used in an order of the MTC terminals 20A, 20B, 20C, and 20D will be assumed. In this case, as shown in FIG. 18, the MTC terminal 20A uses the resource block #1 that is the reference resource block, the MTC terminal 20B uses a resource block #2 that is adjacent with the resource block #1 in the time direction. Similarly, the MTC terminal 20C uses a resource block #3 that is adjacent with the resource block #2 in the time direction, and the MTC terminal 20D uses a resource block #4 that is adjacent with the resource block #3 in the time direction.

Figure 19:
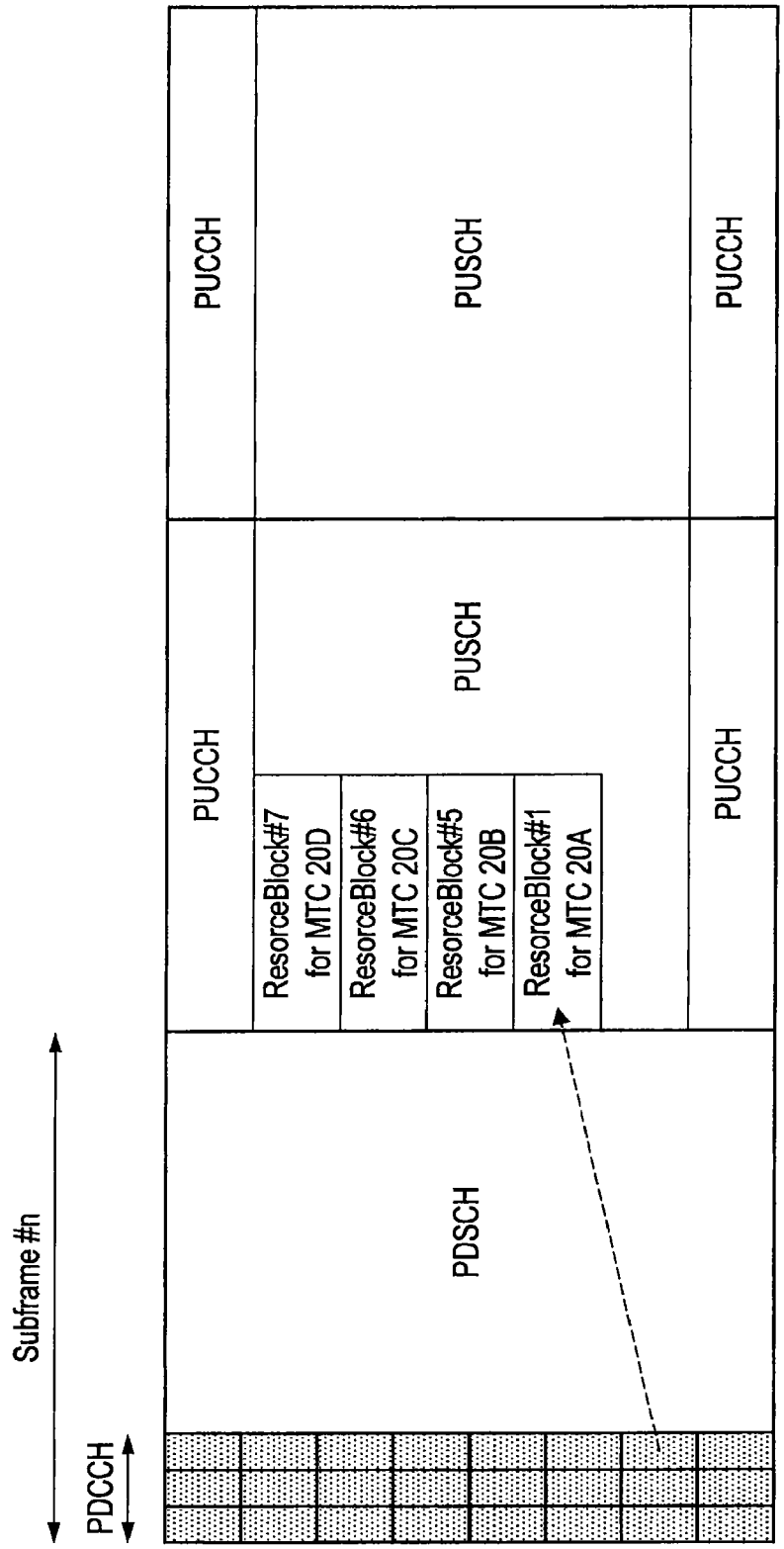
FIG. 19 is an explanatory diagram showing a modification of the relationship of the reference resource block and the uplink resource block of each MTC terminal.

As a modification, settings may be made with a reference resource block as an origin to use resource blocks that are adjacent in a frequency direction in an order of MTC terminals 20A, 20B, 20C, and 20D. In this case, as shown in FIG. 19, the MTC terminal 20A uses a resource block #1 that is the reference resource block, and the MTC terminal 20B uses the resource block #5 that is adjacent to the resource block #1 in the frequency direction. Similarly, the MTC terminal 20C uses the resource block #6 that is adjacent to the resource block #5 in the frequency direction, and the MTC terminal 20D uses the resource block #7 that is adjacent to the resource block #6 in the frequency direction.

Notably, the base station 10 may signal the positional relationship of the resource block to which each MTC terminal 20 is to perform the transmission process and the reference resource block in advance to each MTC terminal 20. Further, although an example in which the fifth embodiment is implemented by the MTC-GP_RNTI was described, the fifth embodiment may be implemented by replacing the MTC-GP_RNTI with the C-RNTI. For example, in a case of not being able to handle the MTC-GP_RNTI, the base station 10 can allot the same C-RNTI to a plurality of MTC terminals 20, and the C-RNTI may be used in a similar way as with the above MTC-GP_RNTI.

Operation of Fifth Embodiment

Hereabove, sharing of the resource information in the fifth embodiment was described. Now, an operation of the radio communication system 1 according to the fifth embodiment will be described with reference to FIG. 20.

Figure 20:
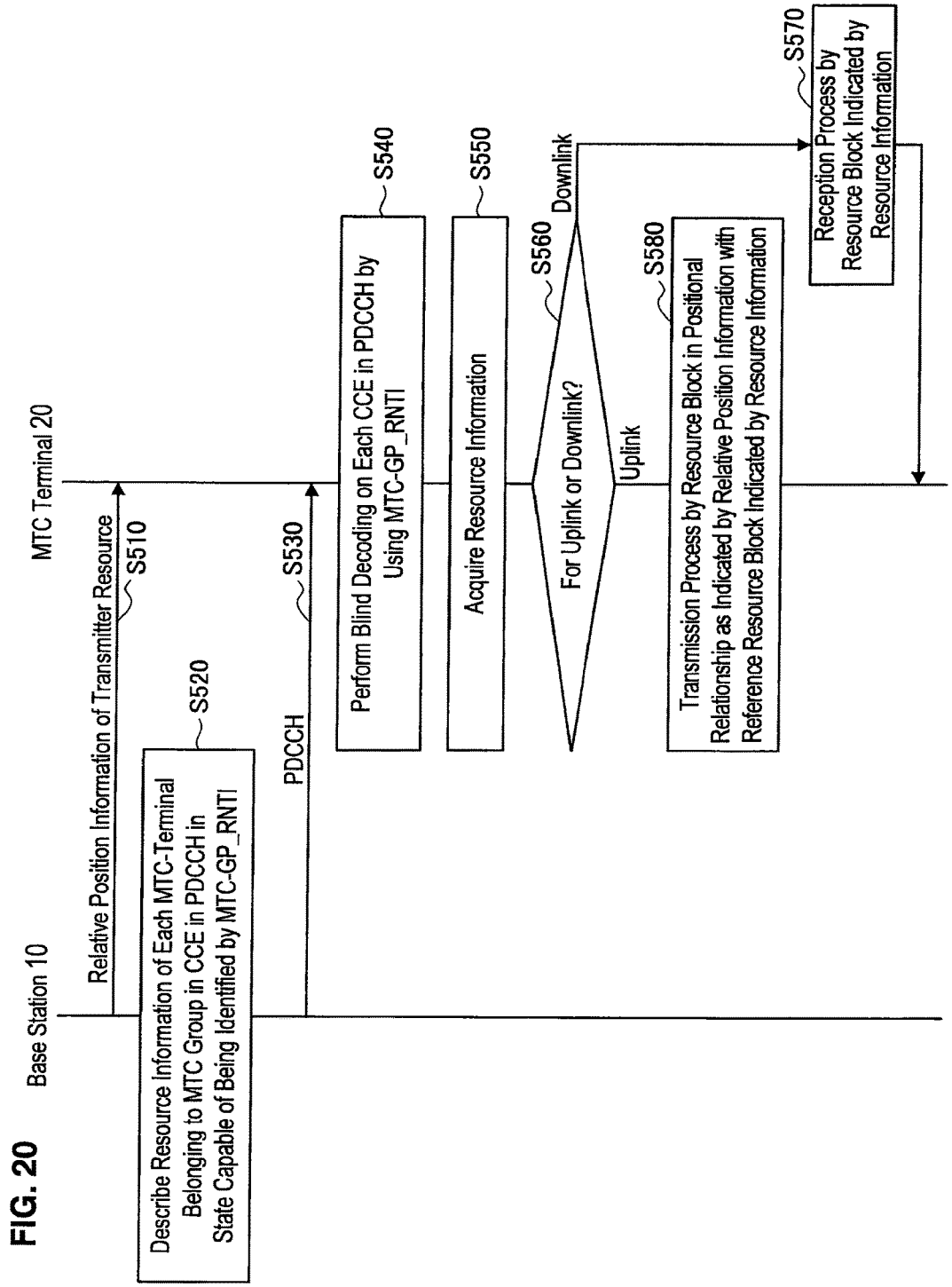
FIG. 20 is an explanatory diagram showing an operation of a radio communication system of a fifth embodiment.

FIG. 20 is an explanatory diagram showing the operation of the radio communication system 1 of the fifth embodiment. As shown in FIG. 20, the base station 10 transmits relative position information indicating the positional relationship of the resource blocks to which the MTC terminals 20 are to perform the transmission to the MTC terminals 20 in advance (S510).

Thereafter, the control signal generating section 120 of the base station 10 describes the resource information for each MTC terminal 20 belonging to the MTC group in a state capable of being identified by the MTC-GP_RNTI assigned to the MTC group to the CCEs in the PDCCH (S520). Specifically, the control signal generating section 120 adds the check bit obtained by the CRC circuit 124 by masking the resource information for each MTC terminal 20 with the MTC-GP_RNTI to the CCEs. Then, the base station 10 transmits the PDCCH including the CCE in which the resource information for each MTC terminal 20 is described (S530).

Then, when each MTC terminal 20 receives the PDCCH from the base station 10, the blind decoding section 220 of the MTC terminal 20 performs blind decoding on each CCE in the PDCCH by using the MTC-GP_RNTI assigned to itself (S540), and obtains the resource information for the MTC group including itself (S550).

Here, in a case where the obtained resource information indicates a downlink resource block (S560), the MTC terminal 20 performs the reception process in the resource block indicated by the resource information (S570).

On the other hand, in a case where the obtained resource information indicates an uplink resource block (S560), the MTC terminal 20 performs the transmission process in the resource block that is in the positional relationship as indicated by the relative position information with the reference resource block indicated by the resource information (S580).

As described above, according to the fifth embodiment, due to no longer being necessary to describe the resource information for each MTC terminal 20 to the respective CCEs, the search space in the PDCCH can be made small. As a result, load related to the blind decoding in the MTC terminals 20 can be reduced.

2-6. Sixth Embodiment

The sixth embodiment is implemented by adapting the third embodiment described with reference to FIG. 15 to the fifth embodiment. Specifically, a base station 10 according to the sixth embodiment disposes a CCE including resource information for one MTC group in a predetermined sub carrier. According to the configuration, since an MTC terminal 20 simply needs to perform blind decoding on only the predetermined sub carrier in a time direction, load related to the blind decoding in the MTC terminal 20 can be reduced significantly.

2-7. Seventh Embodiment

The seventh embodiment is implemented by adapting the fourth embodiment described with reference to FIG. 16 to the fifth embodiment. Specifically, an MTC terminal 20 of the seventh embodiment belongs to an uplink MTC group and a downlink MTC group. Due to this, the MTC terminal 20 is assigned with MTC-DownLink_RNTI that is a group identifier for downlink, and MTC-UpLink_RNTI that is a group identifier for uplink.

In this case, the base station 10 generates the CCE including the uplink resource information of the MTC group by using the MTC-UpLink_RNTI, and generates the CCE including the downlink resource information by using the MTC-DownLink_RNTI.

Due to this, the MTC terminal 20 can extract the CCE for the MTC group to which the MTC terminal 20 belongs by performing blind decoding on each CCE in the PDCCH by using the MTC-DownLink_RNTI and the MTC-UpLink_RNTI.

3. CONCLUSION

As described above, according to the first embodiment to the fourth embodiment of the invention, the resource information for a large number of MTC terminals 20 can be stored by mapping the resource information (assign, grant) for each MTC terminal 20 in the second search space in the PDSCH. Further, since a number of the CCEs in the PDCCH can be suppressed, the search space in which the MTC terminal 20 performs the blind decoding can be reduced. As a result, load related to the blind decoding in the MTC terminal 20 can be reduced.

Further, according to the fifth embodiment to the seventh embodiment of the invention, the resource information described in the CCE in the PDCCH can be shared by the plurality of MTC terminals 20 in the MTC group. Due to this, the resource information for each MTC terminal 20 no longer needs to be described in separate CCEs, so the search space in the PDCCH can be made small. As a result, load related to the blind decoding in the MTC terminals 20 can be reduced.

Notably, although preferred embodiments of the invention have been described in detail with reference to the attached drawings, the invention is not limited to these examples. A person skilled in the art find various alterations and modifications within the scope of the appended claims, and it should be understood that they will naturally come under the technical scope of the present invention.

For example, respective steps in the processes by the base station 10 and the MTC terminal 20 in the description do not necessarily be performed in chronological orders as described in sequence diagrams. For example, the respective steps in the processes by the base station 10 and the MTC terminal 20 may be performed in orders different from the orders described the in sequence diagrams, or may be performed in parallel.

Further, computer programs for causing hardware such as CPUs, ROMs, and RAMs installed in the base station 10 and the MTC terminal 20 to exhibit similar functions as the respective configurations of the base station 10 and the MTC terminal 20 may be produced. Further, storage media storing such computer programs may also be provided.

REFERENCE SIGNS LIST

10 Base station
12 MME
14 S-GW
16 PDN-GW
20 MTC terminal
30 MTC server
104, 204 Antenna
108, 208 Radio processing section
112, 212 Storage section
116 Scheduler
120 Control signal generating section
124, 224 CRC circuit
128 Data mapping section
220 Blind decoding section

The invention claimed is:

1. An electronic device, comprising:
   circuitry configured to:
   generate a control signal to control a plurality of radio terminals,
      wherein the control signal includes a plurality of resource information items and a check bit, and
      wherein the check bit is obtained based on a mask operation of each of the plurality of resource information items;
   allocate a first resource information item of the plurality of resource information items for a first radio terminal of the plurality of radio terminals, in a first narrowband resource of the control signal;
   allocate a second resource information item of the plurality of resource information items for a second radio terminal of the plurality of radio terminals, in a second narrowband resource of the control signal;
   map each of the plurality of resource information items for each of the plurality of radio terminals in a data region of a radio frame; and
   transmit the control signal,
      wherein the first radio terminal belongs to a first machine type communication (MTC) group and the second radio terminal belongs to a second MTC group,
      wherein the first resource information item indicates a search space within the data region for data transmission received by the plurality of radio terminals, and
      wherein the first radio terminal identifies the first resource information item based on an uplink identifier assigned to the first radio terminal and the second radio terminal identifies the second resource information item based on a downlink identifier assigned to the second radio terminal.

2. The electronic device according to claim 1, wherein the circuitry is further configured to notify information, which indicates the first narrowband resource, to the first radio terminal.

3. The electronic device according to claim 1, wherein the control signal includes at least one of the first resource information item, the second resource information item, power control information, paging information, or system information.

4. The electronic device according to claim 1, wherein the first narrowband resource and the second narrowband resource are within the data region of the radio frame for the data transmission received by the plurality of radio terminals.

5. The electronic device according to claim 1, wherein the circuitry is further configured to execute the mask operation of the plurality of resource information items based on one of an exclusive disjunction calculation (XOR) of the plurality of resource information items and an identifier of the first radio terminal or the second radio terminal, or a serial coupling operation of the plurality of resource information items and the identifier of the first radio terminal or the second radio terminal.

6. The electronic device according to claim 1, wherein the mapped each of the plurality of resource information items, for each of the plurality of radio terminals in the data region, reduces load related to a blind decoding operation for each of the plurality of radio terminals.

7. A method, comprising:
in an electronic device:
generating a control signal to control a plurality of radio terminals,
wherein the control signal includes a plurality of resource information items and a check bit, and
wherein the check bit is obtained based on a mask operation of each of the plurality of resource information items;
allocating a first resource information item of the plurality of resource information items for a first radio terminal of the plurality of radio terminals, in a first narrowband resource of the control signal;
allocating a second resource information item of the plurality of resource information items for a second radio terminal of the plurality of radio terminals, in a second narrowband resource of the control signal;
mapping each of the plurality of resource information items for each of the plurality of radio terminals in a data region of a radio frame; and
transmitting the control signal,
wherein the first radio terminal belongs to a first machine type communication (MTC) group and the second radio terminal belongs to a second MTC group, and
wherein the first resource information item indicates a search space within the data region for data transmission received by the plurality of radio terminals, and
wherein the first radio terminal identifies the first resource information item based on an uplink identifier assigned to the first radio terminal and the second radio terminal identifies the second resource information item based on a downlink identifier assigned to the second radio terminal.

8. The method according to claim 7, further comprising notifying information, indicating the first narrowband resource, to the first radio terminal.

9. The method according to claim 7, wherein the control signal includes at least one of the first resource information item, the second resource information item, power control information, paging information, or system information.

10. The method according to claim 7, wherein the first narrowband resource and the second narrowband resource are within the data region of the radio frame for the data transmission received by the plurality of radio terminals.

11. A non-transitory computer-readable medium having stored thereon computer-executable instructions that, when executed by a processor, cause the processor to execute operations, the operations comprising:
generating a control signal to control a plurality of radio terminals,
wherein the control signal includes a plurality of resource information items and a check bit, and
wherein the check bit is obtained based on a mask operation of each of the plurality of resource information items;
allocating a first resource information item of the plurality of resource information items for a first radio terminal of the plurality of radio terminals, in a first narrowband resource of the control signal;
allocating a second resource information item of the plurality of resource information items for a second radio terminal of the plurality of radio terminals, in a second narrowband resource of the control signal;
mapping each of the plurality of resource information items for each of the plurality of radio terminals in a data region of a radio frame; and
transmitting the control signal,
wherein the first radio terminal belongs to a first machine type communication (MTC) group and the second radio terminal belongs to a second MTC group,
wherein the first resource information item indicates a search space arranged within the data region for data transmission received by the plurality of radio terminals, and
wherein the first radio terminal identifies the first resource information item based on an uplink identifier assigned to the first radio terminal and the second radio terminal identifies the second resource information item based on a downlink identifier assigned to the second radio terminal.

12. A radio terminal, comprising:
circuitry configured to:
receive, from a base station, a control signal to control a plurality of radio terminals including the radio terminal,
wherein the control signal includes a plurality of resource information items and a check bit, and
wherein the check bit is obtained based on a mask operation of each of the plurality of resource information items;
acquire a first resource information item of the plurality of resource information items for a first machine type communication (MTC) group in a first narrowband resource of the control signal;
acquire a second resource information item of the plurality of resource information items for a second machine type communication (MTC) group in a second narrowband resource of the control signal,
wherein the plurality of resource information items for each of the first MTC group and the second MTC group is mapped in a data region, and
wherein the first resource information item indicates a search space within the data region for data transmission received by the plurality of radio terminals; and
identifying the first resource information item based on an uplink identifier assigned to the first MTC group and the second resource information item based on a downlink identifier assigned to the second MTC group.

13. The radio terminal of claim 12, wherein the circuitry is further configured to receive a notification of information indicating narrowband resource for each of the first MTC group and the second MTC group.

* * * * *